US006961641B1

(12) United States Patent
Forth et al.

(10) Patent No.: US 6,961,641 B1
(45) Date of Patent: Nov. 1, 2005

(54) INTRA-DEVICE COMMUNICATIONS ARCHITECTURE FOR MANAGING ELECTRICAL POWER DISTRIBUTION AND CONSUMPTION

(75) Inventors: Bradford J. Forth, Victoria (CA); Peter C. Cowan, Victoria (CA); David W. Giles, Sidney (CA); Chuen Shan Simon Ki, Victoria (CA); Jason D. Sheppard, Victoria (CA); John C. Van Gorp, Sidney (CA); Jeffrey W. Yeo, Saanichton (CA); Michael E. Teachman, Victoria (CA); Bryan J. Gilbert, Victoria (CA); Ronald G. Hart, North Saanich (CA)

(73) Assignee: Power Measurement Ltd. (CA)

( * ) Notice: Subject to any disclaimer, the term of this patent is extended or adjusted under 35 U.S.C. 154(b) by 794 days.

(21) Appl. No.: 09/723,564

(22) Filed: Nov. 28, 2000

Related U.S. Application Data

(63) Continuation-in-part of application No. 08/798,723, filed on Feb. 12, 1997, now abandoned, which is a continuation-in-part of application No. 08/369,849, filed on Dec. 30, 1994, now Pat. No. 5,650,936.

(51) Int. Cl.[7] .......................... G05B 11/01; G06F 19/00
(52) U.S. Cl. ......................... 700/295; 700/22; 700/286; 700/297; 705/412
(58) Field of Search .................. 700/22, 286, 291–295, 700/297; 705/412

(56) References Cited

U.S. PATENT DOCUMENTS

| | | | | |
|---|---|---|---|---|
| 4,589,075 A | * | 5/1986 | Buennagel | 700/286 |
| 4,641,248 A | * | 2/1987 | Suzuki et al. | 700/292 |
| 5,181,026 A | * | 1/1993 | Granville | 340/870.28 |
| 5,448,229 A | | 9/1995 | Lee, Jr. | 340/870.02 |
| 5,459,459 A | | 10/1995 | Lee, Jr. | 340/870.02 |
| 5,477,216 A | | 12/1995 | Lee, Jr. et al. | 340/870.02 |
| 5,495,239 A | * | 2/1996 | Ouellette | 340/870.02 |
| 5,517,423 A | * | 5/1996 | Pomatto | 700/286 |
| 5,572,438 A | | 11/1996 | Ehlers et al. | 700/295 |
| 5,576,700 A | * | 11/1996 | Davis et al. | 340/3.31 |

(Continued)

OTHER PUBLICATIONS

Questra Applications Summary Data Sheet, pp. 1–2, Jul. 2, 2002.
Tridium™ Vykon™ Energy “JACE–401™” Product Data Sheet, pp. 1–2, Sep. 16, 2002.
Tridium™ Vykon™ Energy “Vykon Energy Profiler” Product Data Sheet, pp. 1–4, Oct. 16, 2001.
Schneider Electric Square D “Web–Enabled Power Management Solutions” brochure, pp. 1–8, Jan. 2002.
Tridium™ Vykon™ Building “Vykon™ Alarm Service” Product Data Sheet, pp. 1–2, Jun. 20, 2002.

(Continued)

*Primary Examiner*—Paul Rodriguez
(74) *Attorney, Agent, or Firm*—Brinks Hofer Gilson & Lione

(57) ABSTRACT

A power management architecture for an electrical power distribution system, or portion thereof, is disclosed. The architecture includes multiple intelligent electronic devices (“IED’s”) distributed throughout the power distribution system to manage the flow and consumption of power from the system. The IED’s are linked via a network to back-end servers. Power management application software and/or hardware components operate on the IED’s and the back-end servers and inter-operate via the network to implement a power management application. The architecture provides a scalable and cost effective framework of hardware and software upon which such power management applications can operate to manage the distribution and consumption of electrical power by one or more utilities/suppliers and/or customers which provide and utilize the power distribution system.

129 Claims, 15 Drawing Sheets

U.S. PATENT DOCUMENTS

| | | | | | |
|---|---|---|---|---|---|
| 5,680,324 | A | * | 10/1997 | Schweitzer et al. | 370/241 |
| 5,699,276 | A | | 12/1997 | Roos | 379/106.03 |
| 5,736,847 | A | * | 4/1998 | Van Doorn et al. | 324/142 |
| 5,764,155 | A | | 6/1998 | Kertesz et al. | 700/295 |
| 5,862,391 | A | | 1/1999 | Salas et al. | 713/300 |
| 5,897,607 | A | | 4/1999 | Jenney et al. | 702/62 |
| 5,956,220 | A | * | 9/1999 | Novosel et al. | 361/62 |
| 6,005,759 | A | | 12/1999 | Hart et al. | 361/66 |
| 6,035,285 | A | | 3/2000 | Schlect et al. | 705/30 |
| 6,088,659 | A | | 7/2000 | Kelley et al. | 702/62 |
| 6,118,269 | A | | 9/2000 | Davis | 324/110 |
| 6,167,389 | A | | 12/2000 | Davis et al. | 705/412 |
| 6,169,979 | B1 | | 1/2001 | Johnson | 705/412 |
| 6,178,362 | B1 | * | 1/2001 | Woolard et al. | 700/295 |
| 6,259,972 | B1 | * | 7/2001 | Sumic et al. | 700/286 |
| 6,285,917 | B1 | * | 9/2001 | Sekiguchi et al. | 700/239 |
| 6,313,752 | B1 | * | 11/2001 | Corrigan et al. | 340/657 |
| 6,327,541 | B1 | | 12/2001 | Pitchford et al. | 702/62 |
| 6,535,797 | B1 | * | 3/2003 | Bowles et al. | 700/286 |
| 6,549,880 | B1 | * | 4/2003 | Willoughby et al. | 703/13 |
| 6,553,418 | B1 | * | 4/2003 | Collins et al. | 709/224 |
| 6,694,270 | B2 | * | 2/2004 | Hart | 702/57 |
| 2001/0010032 | A1 | | 7/2001 | Ehlers et al. | 702/62 |
| 2001/0039537 | A1 | | 11/2001 | Carpenter et al. | 705/400 |
| 2002/0077729 | A1 | | 6/2002 | Anderson | 700/291 |
| 2002/0091784 | A1 | | 7/2002 | Baker et al. | 709/208 |
| 2002/0116550 | A1 | | 8/2002 | Hansen | 719/330 |
| 2002/0161536 | A1 | | 10/2002 | Suh et al. | 702/62 |
| 2003/0176952 | A1 | | 9/2003 | Collins et al. | 700/286 |

OTHER PUBLICATIONS

Tridium™ Vykon™ Building "JACE–512™" Product Data Sheet, pp. 1–2, May 15, 2002.

Tridium™ Vykon™ Building "JACE–511™" Product Data Sheet, pp. 1–2, May 28, 2002.

Vykon™ By Tridium "JACE–NP–1®" Product Data Sheet, pp. 1–2, May 28, 2002.

Vykon™ By Tridium "WorkPlace Pro™" Product Data Sheet, pp. 1–2, Jan. 12, 2001.

Vykon™ Building "Web Supervisor™" Product Data Sheet, pp. 1–2, Nov. 30, 2001.

A8800–1 AcquiSuite Data Acquisition System specification, pp. 1–2, Sep. 24, 2001.

LiveData® Real–Time Data Management For Energy and Utility Companies brochure, pp. 1–4, ©copyright 2002, Rev. Jan. 2002.

Tridium™ Vykon™ Energy "With the Right Tools Energy Costs are Controllable . . . " brochure, pp. 1–8, Nov. 1, 2001.

EnergyView™ "Energy Aggregation & Information System (EAIS) for Monitoring and Analysis of Electric and Gas Demand", selected pages from an EnergyView website http://66.64.38.69/energyview, pp. 1–4, Oct. 30, 2001.

Power Monitoring home page, obtained from http://www.parijat.com/Power_Monitoring.htm, Oct. 9, 2002, one page.

Press Release Aug. 24, 2000 "Connect One Announces Industry's First–Wireless Chip to Connect Mobile Devices to the Internet", pp. 1–2.

Press Release, "Connect One and NAMS Create the World's First Dial–up Energy Meter that Sends and Receives E–Mail Without a Gateway", Sep. 5, 2000, pp. 1–2.

NAMS Metals by Nisko, NMM–AKB Specifications p. 1 of 1, Sep. 5, 2000.

Connect One "Automatic Meter Reading via the Internet", pp. 1–2. Jul. 11, 2001.

iModem™ "The Fastest Way to Internet–Enable any Device", pp. 1–3. Jul. 11, 2001.

ConnectOne™ Connecting your Device to the Internet™ iChip™ The Internet in your palm™, pp. 1–6. Jul. 11, 2001.

Engage Networks Launches Energy Management Venture, obtained at internet address http://www.engagenet.com/content/business_journal.shtml , Sep. 20, 2000. Appeared in Business Journal Feb. 11, 2000.

Engage Networks Inc. "D–Gen" Distributed Generation Management brochure, pp. 1–4. Link present as of Dec. 2, 1998 according to web archive at http://web.archive.org/web/19981205200934/www.engagenet.com/products.htm.

Engage Networks Inc. "Internet Protocol Card for Revenue Meters" brochure, pp. 1–2. Link present as of Mar. 3, 2000 on http://web.archive.org/web/20010306005433/www.engagenet.com/content/products.shtml. Original document archived at http://web.archive.org/web/20030520161648/http://www.engagenet.com/datasheets/ipcard.pdf on May 20, 2003.

Engage Networks Inc. "AEM" (Active Energy Management) brochure, pp. 1–2. Link present as of Mar. 3, 2000 on http://web.archive.org/web/20010306005433/www.engagenet.com/content/products.shtml. Original document archived at http://web.archive.org/web/20030520161850/http://www.engagenet.com/datasheets/aem.pdf.

David W. Giles, "Direct–Access Metering Via the Web", 1998 CEA Conference, Toronto, Canada, pp. 1–19, © 1998 Power Measurement Ltd. Conference Apr. 27–29, 1998. Presented Apr. 29, 1998.

GE Industrial Systems "EnerVista.com" brochure, Sep. 2000.

Press release, Santa Clara, CA Sep. 25, 2000 "Connect One Reduces Time, Cost and Complexity to Connect Internet Appliances to Ethernet Lans", obtained at internet address http://www.connectone.com/html/prlsep25_2000.htm.

Year 2000 Rediness Disclosure Arcom Control Systems, "Apex", obtained at internet address http://www.arcomcontrols.com/products/pcp/pcp10.htm. Document archived at http://web.archive.org/web/20000530063150/www.arcomcontrols.com/products/pcp/pcp10.htm on May 30, 2000.

Dranetz BMI, Signature System™ "Information, Knowledge, Power" brochure. Applicants believe this reference was published prior to Jan. 9, 2003.

Signature System™ Basics, obtained at internet address http://www.signaturesystem.com/sigbasics.html, Mar. 26, 2001. pp. 1–2.

Signature System™ InfoNodes, obtained at internet address http://www.signaturesystem.com/infonode.html, Mar. 26, 2001. pp. 1–2.

Questra A2B.Platform™ brochure, "Enabling conversation through universal connectivity", pp. 1–4, located at http://www.questra.com/h1_products/Questra_A2Bplatform. Applicants believe this reference was published prior to Jan. 9, 2003.

Questra A2B.Sales™ brochure, "Conversation to help you win", pp. 1–2, located at http://www.questra.com/h1_products/Questra_A2Bsales. Applicants believe this reference was published prior to Jan. 9, 2003.

Power Point Presentation: Presented at "Metering Europe 2000," Sep. 5–7, 2000, source http://www.energyict.com/fh/media/Presentation_Metering2000Munchen5.zip, pp. 1–37.

Brochure, RTU+Server, source http://www.energyict.com/fh/media/tru__plus__server.pdf, pp. 1–3, Apr. 6, 2001. Document archived at http://web.archived.org/web/20020702060538/http://www.energyict.com/fh/media/rtu__plus__server.pdf Feb. 7, 2001. Link present on http://web.archive.org/web/20010207201520/www.energyict.com/fa/en__ab__frame.htm on or before Feb. 7, 2001.

Brochure, EiServer, The Energy Information server, source http://www.energyict.com/fh/media/EiServer.pdf, pp. 1–7, Jul. 14, 2000. Llink present on or before Feb. 7, 2001.

Advertisement, EiServer and RTU+Server, source, Metering International—2001 Issue 1, p. 19, publish date 1st Quarter 2001, p. 1.

Article, "Providing Tomorrow's Energy Management and Metering Tools Today," source, Metering International—2001 Issue 1, p. 18, publish date 1st Quarter 2001, p. 1.

"Email relating to the general technology of the application received from a competitor", from Erich W. Gunther [mailto:erich@electrotek.com] to Brad__Forth@ pml.com sent May 9, 2001 3:36pm, pp. 1–2.

Electro Industries Press Release "Nexus 1250 High–Performance Power Monitor Gains Ethernet TCP/IP Capabilities," obtained at internet address http://www.electroindustries.com/feb5.html, Feb. 5, 2001 pp. 1–2.

Electro Industries "Nexus. 1250 for Industry and Utilities," brochure, obtained at internet address http://www.electroindustries.com/pdf/nxsbrochure.pdf pp. 1–14 printed Jun. 1, 2001.

NetSilicon Solutions on Chip "NET+ARM™ Ethernet Processors" brochure, obtained at internet address http://www.netsilicon.com/EmbWeb/products/netarm.asp, pp. 1–2, Copyright© 2001 NetSilicon, Inc. Document archived http://web.archive.org/web/20010719171514/www.netsilicon.com/embweb/products/netarm.asp on Jul. 19, 2001 on Jul. 19, 2001.

EmWare® "Solutions Device Link," brochure, obtained at internet address http://www.emware.com/solutions/devicelink/, pp. 1–3, printed Jun. 1, 2001. Document archived http://web.archive.org/web/20010524222001/www.emware.com/solutions/devicelink/ May 24, 2001.

IReady® "Technology iReady's Hardwired TCP/IP Stack," homepage, obtained at internet address http://www.iready.com/, p. 1, ©2000–2001 iReady corporation, printed Jun. 1, 2001. First publishes as early as Mar. 1, 2001. http://web.archive.org/web/20010515202409/http://www.iready.com/ link on right side to "technology/index.html" captured Mar. 15, 2001.

muNet News & Events Press Releases "muNet makes cable industry debut with its WebGate™ Internet Residential and Commercial Information Systems, and HomeHeartBeat", http://www.munet.com, pp. 1–2, Dec. 15, 1999.

muNet News & Events Press Releases "muNet's WebGate™ Systems Finds a Home on the Internet!" http://www.munet.com, pp. 1–2, Mar. 18, 1999.

webGate™ IRIS Technology, products brochure pp. 1–9. Applicants believe this reference was published prior to Jan. 9, 2003.

MuNet News & Events Press Release "muNet Demonstrates End–to–Enc IP–Based Energy Management System at DistribuTECH," Feb. 5, 2000, pp 1–2.

WebGate™ IRIS™ "Internet Residential Information System," p. 1 of 1 Published in Energy IT Nov./Dec. 2000 Technology Info Center. See http://www.platts.com/infotech/issues/0011/eittic0011.shtml for this reference—search for munet.com.

WebGate™ ICIS™ "Internet Commercial Information System," p. 1 of 1 Published in Energy IT Nov./Dec. 2000 Technology Info Center. See http://www.platts.com/infotech/issues/0011/eittic0011.shtml for this reference—search or munet.com.

F. Momal, C. Pinto–Pereira, "Using World–Wide–Web for Control Systems" Abstract, A Division CERN, 1211 Geneva 23, 6 pages. Published 1995.

P. M. Corcoran, J. Desbonnet and K. Lusted THPM 14.2 "CEBus Network Access via the World–Wide–Web" Abstract, ©1996 IEEE, pp. 236 & 237.

ATI Systems, "Technical Overview Ethernet SCAN II™ Module" specification, Oct. 1994, 2 pages.

J. Hofman, "The Consumer Electronic Bus: An Integrated Multi–Media LAN for the Home", International Journal of Digital and Analog Communication Systems, vol. 4, 77–86 (1991), ©1991 by John Wiley & Sons, Ltd.

Lucent Technologies AT&T Forms Expert Team to Design Utility Industry Solutions, press release, Monday, Jan. 23, 1995, pp. 1&2.

Newsbytes Inc., Tampa, FLA, Apr. 13, 1995 pNEW04130013 "TECO & IBM—The "Smart House" Is Here" Press release, obtained at http://filebox.vt.edu/users/mikemike/smart–house/infotrac/article4.txt, Jun. 11, 2002, pp. 1&2.

Distributed.Net, http://n0cgi.distributed.net/faq/cache/178.html, printed Jun. 10, 2003. Link archived at http://web.archive.org/web/20000901052607/n0cgi.distributed.net/faq/cache/178.html__on__Sep. 1, 2000.

Questra, Security overview, obtained http://www.questra.com/products/security.asp, printed Jun. 10, 2003. 2 pages. Applicants believe this reference was published prior to Jan. 9, 2003.

Questra Mastering Smart Security brochure, 2 pages Copyright 2002 Questra Corporation, obtained http://www.questra.com/collateral/collateral__files/SecurityOverview.pdf, printed Jun. 10, 2003. Applicants believe this reference was published prior to Jan. 9, 2003.

Questra Total Access brochure, 2 pages, Copyright 2003 Questra Corporation, obtained http://www.questra.com/collateral/collateral__files/TotalAccess.pdf, printed Jun. 10, 2003. Applicants believe this reference was published prior to Jan. 9, 2003.

Axeda DRM System Overview, 2 pages, obtained http://www.axeda.com/solutions/overview.html, printed Jun. 9, 2003. Applicants believe this reference was published prior to Jan. 9, 2003.

Axeda Access, 3 pages, obtained http://www.axeda.com/solutions/portals/portal__access.html, printed Jun. 9, 2003. Applicants believe this reference was published prior to Jan. 9, 2003.

Axeda DRM Technology Overview, 1 page, obtained http://www.axeda.com/solutions/tech__challenges/firewallfriendly.html, printed Jun. 9, 2003. Applicants believe this reference was published prior to Jan. 9, 2003.

Axeda DRM Technology Overview, 1 page, obtained http://www.axeda.com/solutions/tech__challenges/index.html, printed Jun. 9, 2003. Applicants believe this reference was published prior to Jan. 9, 2003.

Axeda DRM Technology Overview, 1 page, obtained http://www.axeda.com/solutions/tech_challenges/standards.html, printed Jun. 9, 2003. Applicants believe this reference was published prior to Jan. 9, 2003.
Axeda Solutions for Industry, 1 page, obtained http://www.axeda.com/solutions/industries/industrial.html, printed Jun. 9, 2003. Archived at http://www.axeda.com/solutions/industries/industrial.html, printed Jun. 9, 2003. Archived at http://web.archive.org/web/20020221165907/http://axeda.com/industries/industrial.html on Feb. 21, 2002.
Axeda Agents, 2 pages, obtained http://www.axeda.com/solutions/device_servers/index.html, printed Jun. 9, 2003. Applicants believe this reference was published prior to Jan. 9, 2003.
Axeda Case Studies, "Axeda Prevents Power Failures at a Leading Microprocessor Plant in Israel", 2 pages, obtained http://www.axeda.com/industies/casestudies_microprocessor.html, printed June 9, 2003. Applicants believe this reference was published prior to Jan. 9, 2003.

David Mueller and Sandy Smith, Electrotek Concepts, "Using Web–based Power Quality Monitoring for Problem Solving and Improving Customer Relations", proceedings of the 4$^{th}$ Annual Latin American Power 99 Conference, Jun. 29, 1999, pp. 263–271.

* cited by examiner

FIG. 11

Site1.a8500 Default Diagram

| LABEL | VALUE |
|---|---|
| I a | 197.97 |
| I b | 207.52 |
| I c | 237.82 |
| Vln c | 479.28 |
| Vln b | 371.46 |
| Vll ca | 580.46 |
| Vll ab | 589.1 |
| Vll bc | 586.28 |
| Vll avg | 585.28 |
| Vln avg | 357.23 |
| I avg | 214.44 |
| PF sign tot | -94 |
| Freq | 59 |
| CL1 LocalTime | 08:32.9 |

Sum of Currents: 643.31

Formula-based Setpoint: OVER 550 Volts

Change Update Rate
Type in the number of seconds you would like between page updates and hit <RETURN> 10

Some features to implement:

Auto-detection: Excel could automatically add a worksheet (a "tab" below) when it detects a new device on the network

Complex Aggregation: Because it is Excel, you can do anything you want, easily

Logging: You could write simple scripts to log the values on the left to an Access DE

Animation: Charts, warnings, etc

Onboard logs could be displayed easily

Default diagrams: we just need to create an excel template for each device

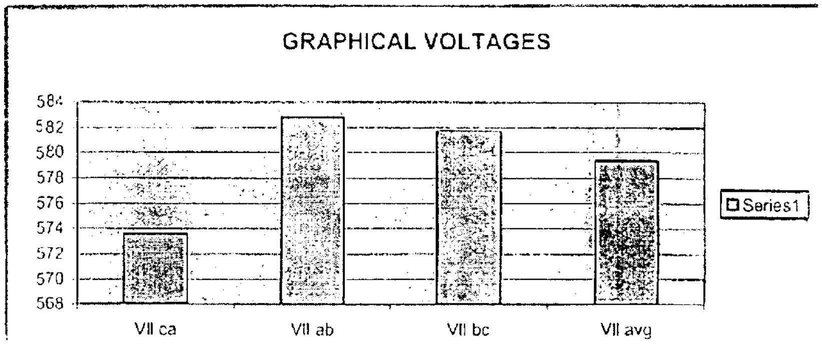

INTRA-DEVICE COMMUNICATIONS ARCHITECTURE FOR MANAGING ELECTRICAL POWER DISTRIBUTION AND CONSUMPTION

RELATED APPLICATIONS

This application is a continuation-in-part under 37 C.F.R. § 1.53(b) of U.S. patent application Ser. No. 08/798,723 filed Feb. 12, 1997, abandoned, the entire disclosure of which is hereby incorporated by reference, which is a continuation-in-part under 37 C.F.R. § 1.53(b) of U.S. patent application Ser. No. 08/369,849 filed Dec. 30, 1994 now U.S. Pat. No. 5,650,936, the entire disclosure of which was incorporated by reference.

The following co-pending and commonly assigned U.S. patent application has been filed on the same date as the present application. This application relates to and further describes other aspects of the embodiments disclosed in the present application and is herein incorporated by reference.

U.S. patent application Ser. No. 09/724,309, now U.S. Pat. No. 6,671,654. "APPARATUS AND METHOD FOR MEASURING AND REPORTING THE RELIABILITY OF A POWER DISTRIBUTION SYSTEM", filed concurrently herewith.

BACKGROUND

With the advent of high technology needs and market deregulation, today's energy market has become very dynamic. High technology industries have increased their demands on the electrical power supplier, requiring more power, increased reliability and lower costs. A typical computer data center may use 100 to 300 watts of energy per square foot compared to an average of 15 watts per square foot for a typical commercial building. Further, an electrical outage, whether it is a complete loss of power or simply a drop in the delivered voltage, can cost these companies millions of dollars in down time and lost business.

In addition, deregulation of the energy industry is allowing both industrial and individual consumers the unprecedented capability to choose their supplier which is fostering a competitive supply/demand driven market in what was once a traditionally monopolistic industry.

The requirements of increased demand and higher reliability are burdening an already overtaxed distribution network and forcing utilities to invest in infrastructure improvements at a time when the deregulated competitive market is forcing them to cut costs and lower prices. Accordingly, there is a need for a system of managing the distribution and consumption of electrical power which meets the increased demands of users and allows the utility supplier to compete in a deregulated competitive marketplace.

SUMMARY

The present invention is defined by the following claims, and nothing in this section should be taken as a limitation on those claims. By way of introduction, the preferred embodiments described below relate to an electrical power management architecture for managing an electrical power distribution system. The architecture includes a network and at least one intelligent electronic device ("IED") coupled with a portion of the electrical power distribution system and further coupled with the network. Each of the at least one IED is operative to implement a power management function in conjunction with the portion of the electrical power distribution system. The power management function is operative to respond to at least one power management command and generate power management data. Each of the at least one IED includes a first network interface operative to couple the at least one IED with the network and facilitate transmission of the power management data and receipt of the at least one power management command over the network. Each of the at least one IED further includes a security module coupled with the first network interface and operative to prevent unauthorized access to the power management data. The architecture further includes a power management application coupled with the network and operative to receive and process the power management data from the at least one IED and generate the at least one power management command to the at least one IED to implement the power management function.

The preferred embodiments further relate to a method of managing an electrical power distribution system, the electrical power distribution system comprising an electrical power management architecture, the architecture comprising a network, at least one intelligent electronic device ("IED") coupled with a portion of the electrical power distribution system and further coupled with the network, and a power management application coupled with the network. The method comprises: implementing a power management function with each of the at least one IED in conjunction with the portion of the electrical power distribution system; generating power management data from the power management function; securing the power management data from unauthorized access; transmitting the secured power management data over the network; receiving the secured power management data by the power management application; authenticating the secured power management data; processing the authenticated power management data; generating at least one power management command by the power management application; securing the at least one power management command from unauthorized access; transmitting the secured at least one power management command over the network; receiving the secured at least one power management command by at least one of the at least one IED; authenticating the secured at least one power management command; responding to the authenticated at least one power management command to implement the power management function.

Further aspects and advantages of the invention are discussed below in conjunction with the preferred embodiments.

BRIEF DESCRIPTION OF THE DRAWINGS

FIG. 11 illustrates an exemplary display generated by the embodiment of FIG. 10.

DETAILED DESCRIPTION OF THE PRESENTLY PREFERRED EMBODIMENTS

Figure 1:
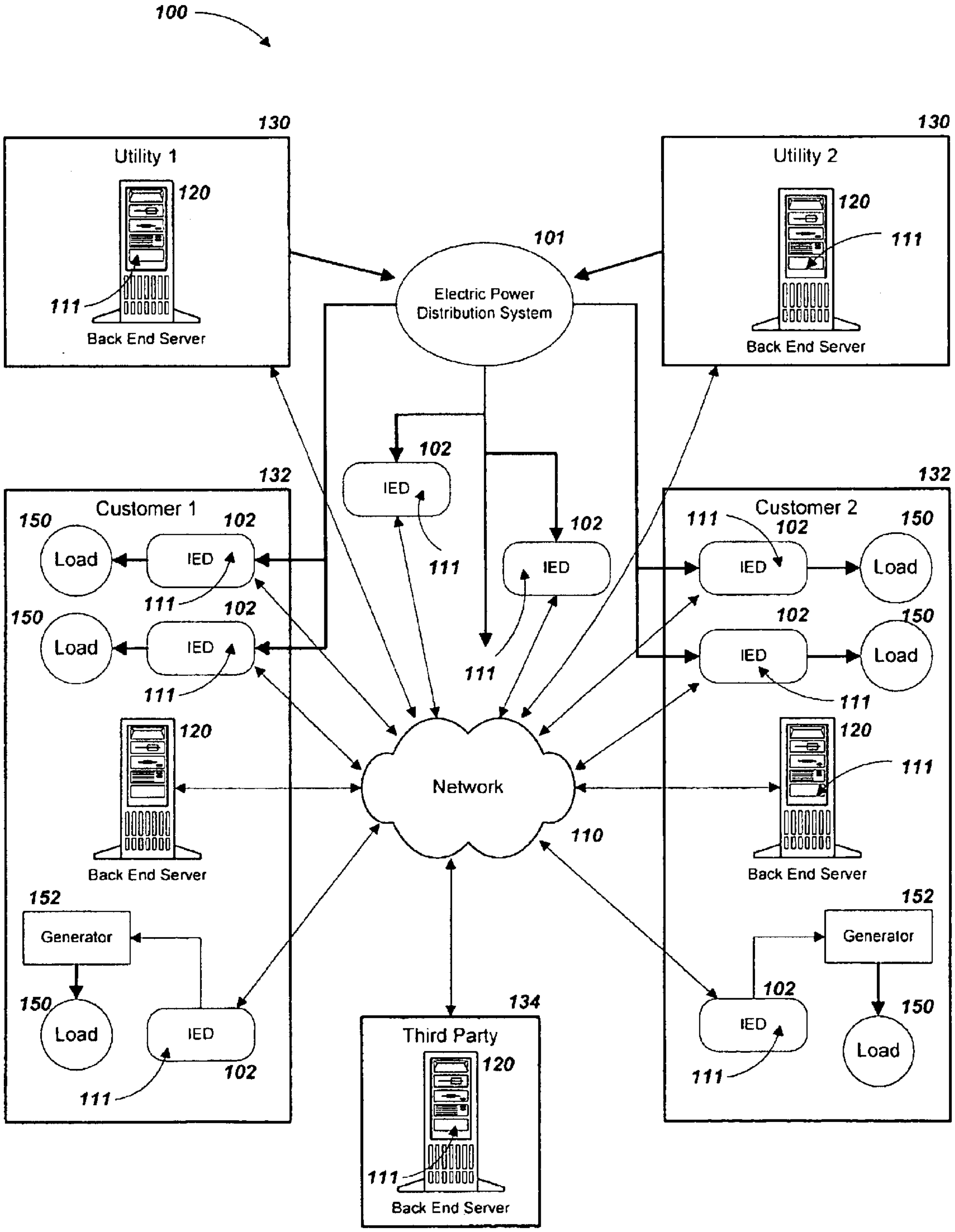
FIG. 1 illustrates a first embodiment of the Power Management Architecture.

Intelligent electronic devices ("IED's") such as programmable logic controllers ("PLC's"), Remote Terminal Units ("RTU's"), electric/watt hour meters, protection relays and fault recorders are widely available that make use of memory and microprocessors to provide increased versatility and additional functionality. Such functionality includes the ability to communicate with remote computing systems, either via a direct connection, e.g. modem or via a network. For more detailed information regarding IED's capable of network communication, please refer to U.S. patent application Ser. No. 08/798,723, captioned above. In particular, the monitoring of electrical power, especially the measuring and calculating of electrical parameters, provides valuable information for power utilities and their customers. Monitoring of electrical power is important to ensure that the electrical power is effectively and efficiently generated, distributed and utilized. Various different arrangements are presently available for monitoring, measuring, and controlling power parameters. Typically, an IED, such as an individual power measuring device, is placed on a given branch or line proximate to one or more loads which are coupled with the branch or line in order to measure/monitor power system parameters. Herein, the phrase "coupled with" is defined to mean directly connected to or indirectly connected with through one or more intermediate components. Such intermediate components may include both hardware and software based components. In addition to monitoring power parameters of a certain load(s), such power monitoring devices have a variety of other applications. For example, power monitoring devices can be used in supervisory control and data acquisition ("SCADA") systems such as the XA/21 Energy Management System manufactured by GE Harris Energy Control Systems located in Melbourne, Fla.

In a typical SCADA application, IED's/power measuring devices individually dial-in to a central SCADA computer system via a modem. However, such dial-in systems are limited by the number of inbound telephone lines to the SCADA computer and the availability of phone service access to the IED/power measuring devices. With a limited number of inbound telephone lines, the number of IED's/power measuring devices that can simultaneously report their data is limited resulting in limited data throughput and delayed reporting. Further, while cellular based modems and cellular system access are widely available, providing a large number of power measuring devices with phone service is cumbersome and often cost prohibitive. The overall result is a system that is not easily scalable to handle a large number of IED's/power measuring devices or the increased bandwidth and throughput requirements of advanced power management applications. However, the ability to use a computer network infrastructure, such as the Internet, allows for the use of power parameter and data transmission and reporting on a large scale. The Internet provides a connectionless point to point communications medium that is capable of supporting substantially simultaneous communications among a large number of devices. For example this existing Internet infrastructure can be used to simultaneously push out billing, load profile, or power quality data to a large number of IED/power measurement and control devices located throughout a power distribution system that can be used by those devices to analyze or make intelligent decisions based on power consumption at their locations. The bandwidth and throughput capabilities of the Internet supports the additional requirements of advanced power management applications. For example, billing data, or other certified revenue data, must be transferred through a secure process which prevents unauthorized access to the data and ensures receipt of the data by the appropriate device or entity. Utilizing the Internet, communications can be encrypted such as by using encrypted email. Further, encryption authentication parameters such as time/date stamp or the IED serial number, can be employed. Within the Internet, there are many other types of communications applications that may be employed to facilitate the above described inter-device communications such as email, Telnet, file transfer protocol ("FTP"), trivial file transfer protocol ("TFTP") or proprietary systems, both unsecured and secure/encrypted.

As used herein, Intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. Such devices typically utilize memory and microprocessors executing software to implement the desired power management function. IED's include on-site devices coupled with particular loads or portions of an electrical distribution system and are used to monitor and manage power generation, distribution and consumption. IED's are also referred herein as power management devices ("PMD's").

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/output (I/O) control, logic, timing, counting, report generation, communication, arithmetic, and data file manipulation. A PLC consists of a central processor, input\output interface, and memory. A PLC is designed as an industrial control system. An exemplary PLC is the SLC 500 Series, manufactured by Allen-Bradley in Milwaukee, Wis.

A meter, is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. An exemplary meter is the model 8500 meter, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Colo.

IED's can also be created from existing electromechanical meters or solid-state devices by the addition of a monitoring and control device which converts the mechanical rotation of the rotary counter into electrical pulses or monitors the pulse output of the meter. An exemplary electromechanical meter is the AB1 Meter manufactured by ABB in Raleigh, N.C. Such conversion devices are known in the art.

This invention describes a communications architecture that can be used for monitoring, protection and control of devices and electrical power distribution in an electrical power distribution system, where IED's can interact with other IED's and attached devices.

As will be described in more detail below, a power management architecture for an electrical power distribution system, or portion thereof, is disclosed. The architecture provides a scalable and cost effective framework of hardware and software upon which power management applications can operate to manage the distribution and consumption of electrical power by one or more utilities/suppliers and/or customers which provide and utilize the power distribution system.

Power management applications include automated meter reading applications, load shedding applications, deregulated supplier management applications, on-site power generation management applications, power quality management applications, protection/safety applications, and general distribution system management applications, such as equipment inventory and maintenance applications. A power management application typically includes one or more application components which utilize the power management architecture to interoperate and communicate thereby implementing the power management application.

The architecture includes Intelligent Electronic Devices ("IED's") distributed throughout the power distribution system to monitor and control the flow of electrical power. IED's may be positioned along the supplier's distribution path or within a customer's internal distribution system. IED's include revenue electric watt-hour meters, protection relays, programmable logic controllers, remote terminal units, fault recorders and other devices used to monitor and/or control electrical power distribution and consumption. As was noted, IED's also include legacy mechanical or electromechanical devices which have been retrofitted with appropriate hardware and/or software so as to be able to integrate with the power management architecture. Typically an IED is associated with a particular load or set of loads which are drawing electrical power from the power distribution system. As was described above, the IED may also be capable of receiving data from or controlling its associated load. Depending on the type of IED and the type of load it may be associated with, the IED implements a power management function such as measuring power consumption, controlling power distribution such as a relay function, monitoring power quality, measuring power parameters such as phasor components, voltage or current, controlling power generation facilities, or combinations thereof. For functions which produce data or other results, the IED can push the data onto the network to another IED or back end server, automatically or event driven, (discussed in more detail below) or the IED can wait for a polling communication which requests that the data be transmitted to the requester.

In addition, the IED is also capable of implementing an application component of a power management application utilizing the architecture. As was described above and further described below, the power management application includes power management application components which are implemented on different portions of the power management architecture and communicate with one another via the architecture network. The operation of the power management application components and their interactions/communications implement the power management application. One or more power management applications may be utilizing the architecture at any given time and therefore, the IED may implement one or more power management application components at any given time.

The architecture further includes a communications network. Preferably, the communication network is a publicly accessible data network such as the Internet or other network or combination of sub-networks that transmit data utilizing the transport control protocol/internet protocol ("TCP/IP") protocol suite. Such networks include private intranet networks, virtual private networks, extranets or combinations thereof and combinations which include the Internet. Alternatively, other communications network architectures may also be used. Each IED preferably includes the software and/or hardware necessary to facilitate communications over the communications network by the hardware and/or software which implements the power management functions and power management application components. In alternative embodiments, quality of service protocols can be implemented to guarantee timely data delivery, especially in real time applications.

The hardware and/or software which facilitate network communications preferably includes a communications protocol stack which provides a standard interface to which the power management functions hardware/software and power management application components hardware/software interact. As will be discussed in more detail below, in one embodiment, the communications protocol stack is a layered architecture of software components. In the preferred embodiments these layers or software components include an applications layer, a transport layer, a routing layer, a switching layer and an interface layer.

The applications layer includes the software which implements the power management functions and the power management applications components. Further, the applications layer also includes the communication software applications which support the available methods of network communications. Typically, the power management function software interacts with the power management hardware to monitor and or control the portion of the power distribution system and/or the load coupled with the IED. The application component typically interacts with the power management function software to control the power management function or process data monitored by the power management function. One or both of the power management function software and the power management application component software interacts with the communication software applications in order to communicate over the network with other devices.

The communications applications include electronic mail client applications such as applications which support SMTP, MIME or POP network communications protocols, security client applications such as encryption/decryption or authentication applications such as secure-HTTP or secure sockets layer ("SSL"), or other clients which support standard network communications protocols such as telnet, hypertext transport protocol ("HTTP"), file transfer protocol ("FTP"), network news transfer protocol ("NNTP"), instant messaging client applications, or combinations thereof. Other client application protocols include extensible markup language ("XML") client protocol and associated protocols such as Simple Object Access Protocol ("SOAP"). Further, the communications applications could also include client applications which support peer to peer communications. All of the communications applications preferably include the ability to communicate via the security client applications to secure the communications transmitted via the network from unauthorized access and to ensure that received communications are authentic, uncompromised and received by the intended recipient. Further, the communications applications include the ability to for redundant operation through the use of one or more interface layer components (discussed in more detail below), error detection and correction and the ability to communicate through firewalls or similar private network protection devices.

The transport layer interfaces the applications layer to the routing layer and accepts communications from the applications layer that are to be transmitted over the network. The transport layer breaks up the communications layer into one or more packets, augments each packet with sequencing data and addressing data and hands each packet to the routing layer. Similarly, packets which are received from the network are reassembled by the transport layer and the re-constructed communications are then handed up to the applications layer and the appropriate communications applications client. The transport layer also ensures that all packets which make up a given transmission are sent or received by the intended destination. Missing or damaged packets are re-requested by the transport layer from the source of the communication. In the preferred embodiment, the transport layer implements the transport control protocol ("TCP").

The routing layer interfaces the transport layer to the switching layer. The routing layer routes each packet received from the transport layer over the network. The routing layer augments each packet with the source and destination address information. In the preferred embodiment, the routing layer implements the internet protocol ("IP"). It will be appreciated that the TCP/IP protocols implement a connectionless packet switching network which facilitates scalable substantially simultaneous communications among multiple devices.

The switching layer interfaces the routing layer to the interface layer. The switching layer and interface layer are typically integrated. The interface layer comprises the actual hardware interface to the network. The interface layer may include an Ethernet interface, a modem, such as wired modem using the serial line interface protocol ("SLIP") or point to point protocol ("PPP"), wired modem which may be an analog or digital modem such as a integrated services digital network ("ISDN") modem or digital subscriber line ("DSL") modem, or a cellular modem. Further, other wireless interfaces, such as Bluetooth, may also be used. In addition, AC power line data network interface may also be used. Cellular modems further provide the functionality to determine the geographic location of the IED using cellular RF triangulation. Such location information can be transmitted along with other power management data as one factor used in authenticating the transmitted data. In the preferred embodiments, the interface layer provided allows for redundant communication capabilities. The interface layer couples the IED with a local area network, such as provided at the customer or utility site. Alternatively, the interface layer can couple the IED with a point of presence provided by a local network provider such as an internet service provider ("ISP").

Finally, the architecture includes back-end server computers or data collection devices. Back end servers may be provided by the consumer of electric power, the utility supplier of electric power or a third party. In one embodiment, these devices are IED's themselves. The back end servers are also coupled with the network in a same way as the IED's and may also include a communication protocol stack. The back end servers also implement power management applications components which interact and communicate with the power management application components on the IED's to accomplish the power management application. Preferably, the IED's are programmed with the network addresses of the appropriate back end servers or are capable of probing the network for back end servers to communicate with. Similarly, the back end server is programmed with the network addresses of one or more affiliate IED's or is capable of probing the network to find IED's that are connected. In either case of network probing by the IED or back-end server, software and/or hardware is provided to ensure that back-end servers communicate with authorized IED's and vice versa allowing multiple customers and multiple suppliers to utilize the architecture for various power management applications without interfering with each other.

The back end servers preferably are executing software application counterparts to the application clients and protocols operating on the IED's such as electronic mail, HTTP, FTP, telnet, NNTP or XML servers which are designed to receive and process communications from the IED's. Exemplary server communications applications include Microsoft Exchange™. The back end server is therefore capable of communicating, substantially simultaneously, with multiple IED's at any given time. Further, the back end server implements a security application which decrypts and/or authenticates communications received from IED's and encrypts communications sent to IED's.

In one embodiment, software executing on the back end server receives communications from an IED and automatically extracts the data from the communication. The data is automatically fed to a power management application component, such as a billing management component.

In this way, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As used herein, an IED or PMD is a power management device capable of network communication. A back end server is a data collection or central command device coupled with the network which receives power management data from an IED and/or generates power management commands to and IED. An IED may contain a back-end server. The network is any communications network which supports the Transport Control Protocol/Internet Protocol ("TCP/IP") network protocol suite. In the preferred embodiment IED's include devices such as PLC's, RTU's, meters, protection relays, fault recorders or modified electromechanical devices and further include any device which is coupled with an electrical power distribution network, or portion thereof, for the purpose of managing or controlling the distribution or consumption of electrical power.

FIG. 1 illustrates an overview of the preferred embodiment of the Power Management Architecture ("architecture") 100, which contains one or more IED's 102. The IED's 102 are connected to an electrical power distribution system 101, or portion thereof, to measure, monitor and control quality, distribution and consumption of electric power from the system 101, or portion thereof. The power distribution system 101 is typically owned by either a utility/supplier 130 or consumer 132 of electric power however some components may be owned and/or leased from third parties 134. The IED's 102 are further interconnected with each other and back end servers 120 via a network 110 to implement a Power Management Application ("application") 111 (shown as a part of IED 102). In the preferred embodiment, the network 110 is the Internet. Alternatively, the network 110 can be a private or public intranet, an extranet or combinations thereof, or any network utilizing the Transport Control Protocol/Internet Protocol ("TCP/IP") network protocol suite to enable communications, including IP tunneling protocols such as those which allow virtual private networks coupling multiple intranets or extranets together via the Internet. The network 110 may also include portions or sub-networks which use wireless technology to enable communications, such as RF, cellular or Bluetooth technologies. The network 110 preferably supports application protocols such as telnet, FTP, POP3, SMTP, NNTP, Mime, HTTP, SMTP, SNNP, IMAP, proprietary protocols or other network application protocols as are known in the art as well as transport protocols SLIP, PPP, TCP/IP and other transport protocols known in the art.

The Power Management Application 111 utilizes the architecture 100 and comprises power management application components which implement the particular power management functions required by the application 111. The power management application components are located on the IED 102 or on the back end server 120, or combinations thereof, and can be a client component, a server component or a peer component. Application components communicate with one another over the architecture 100 to implement the power management application 111.

In one preferred embodiment the architecture 100 comprises IED's 102 connected via a network 110 and back end servers 120 which further comprise software which utilizes protocol stacks to communicate. IED's 102 can be owned and operated by utilities/suppliers 130, consumers 132 or third parties 134 or combinations thereof. Back end servers 120 can be owned by utilities/suppliers 130, consumers 132, third parties 134 or combinations thereof. For example, an IED 102 is operable to communicate directly over the network with the consumer back-end server 120, another IED 102 or a utility back end server 123. In another example, a utility back end server 123 is operable to connect and communicate directly with customer back end servers 120. Further explanation and examples on the types of data and communication between IED's 102 are given in more detail below.

Furthermore, the architecture's 100 devices, such as the back end servers 120 or IED's 102, can contain an email server and associated communications hardware and software such as encryption and decryption software. Other transfer protocols, such as file transfer protocols (FTP), Simple Object Access Protocol (SOAP), HTTP, XML or other protocols know in the art may also be used in place of electronic mail. Hypertext Transfer Protocol (HTTP) is art application protocol that allows transfer of files to devices connected to the network. FTP is a standard internet protocol that allows exchange of files between devices connect ed on a network. Extensible markup language (XML) is a file format similar to HTML that allows transfer of data on networks. XML is a flexible, self describing, vendor-neutral way to create common information formats and share both the format and the data over the connection. In the preferred embodiment the data collection server is operable by either the supplier/utility 130 or the customer 132 of the electrical power distribution system 101. SOAP allows a program running one kind of operating system to communicate with the same kind, or another kind of operating system, by using HTTP and XML as mechanisms for the information exchange.

Furthermore, the application 111 includes an authentication and encryption component which encrypts commands transmitted across the network 110, and decrypts power management data received over the network 110. Authentication is also performed for commands or data sent or received over the network 110. Authentication is the process of determining and verifying whether the IED 102 transmitting data or receiving commands is the IED 102 it declares itself to be and in the preferred embodiment authentication includes parameters such as time/date stamps, digital certificates, physical locating algorithms such as cellular triangulation, serial or tracking ID's, which could include geographic location such as longitude and latitude. Authentication prevents fraudulent substitution of IED 102 devices or spoofing of IED 102 data generation in an attempt to defraud. Authentication also minimizes data collection and power distribution system 101 control errors by verifying that data is being generated and commands are being received by the appropriate devices. In the preferred embodiment encryption is done utilizing Pretty Good Privacy (PGP). PGP uses a variation of public key system, where each user has a publicly known encryption key and a private key known only to that user. The public key system and infrastructure enables users of unsecured networks, such as the internet, to securely and privately exchange data through the use of public and private cryptographic key pairs.

In the preferred embodiment the architecture is connectionless which allows for substantially simultaneous communications between a substantial number of IED's within the architecture. This form of scalability eclipses the current architectures that utilize point to point connections, such as provided by telephony networks, between devices to enable communications which limit the number of simultaneous communications that may take place.

Figure 2A:
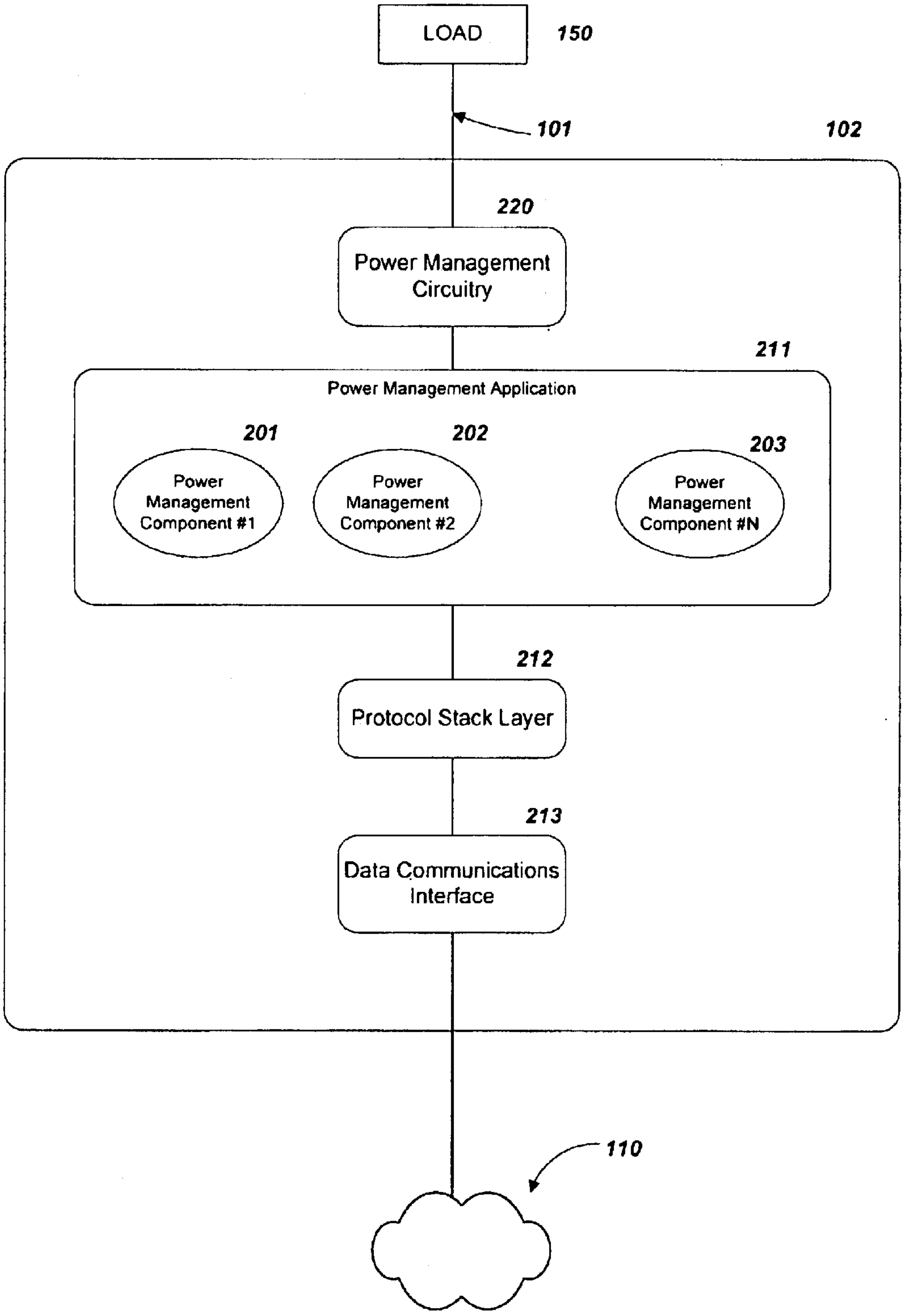
FIG. 2*a* illustrates an IED, for use with the embodiment of FIG. 1, containing several power management components.

FIG. 2*a* illustrates a preferred embodiment where and IED 102 contains several power management components 201, 202, 203 and power management circuitry 220. The power management circuitry 220 is operable to implement the IED's functionality, such as metering/measuring power delivered to the load 150 from the electrical power distribution system 101, measuring and monitoring power quality, implementing a protection relay function, or other functionality of the IED 102. The IED 102 further includes a power management application components 211 coupled with the circuitry 220 and a protocol stack 212 and data communication interface 213. The protocol stack 212 and data communications interface 213 allow the IED 102 to communicate over the network 215. It will be appreciated that, as described below, the protocol stack 212 may include an interface layer which comprises the data communications interface 213. The power management application components 211 include software and/or hardware components which, alone, or in combination with other components, implement the power management application 111. The components 211 may include components which analyze and log the metered/measured data, power quality data or control operation of the IED 102, such as controlling a relay circuit. The components 211 further include software and/or hardware which processes and communicates data from the IED 102 to other remote devices over the network 110, such as back end servers 120 or other IED's 102, as will be described below. For example, the IED 102 is connected to a load 150. The power management circuitry 220 includes data logging software applications, memory and a CPU, which are configured to store kWh data from the load 150 in a memory contained within the power management circuitry. The stored data is then read and processed by the components 201, 202 in the power management application 211. The components communicate with operating system components which contain the protocol stack 212 and the processed data is passed over the network 110 to the appropriate party via the data communications interface 213. One or more of the components 211 may communicate with one or more application components located on one or other IED's 102 and/or one or more back end servers 120.

Figure 2B:
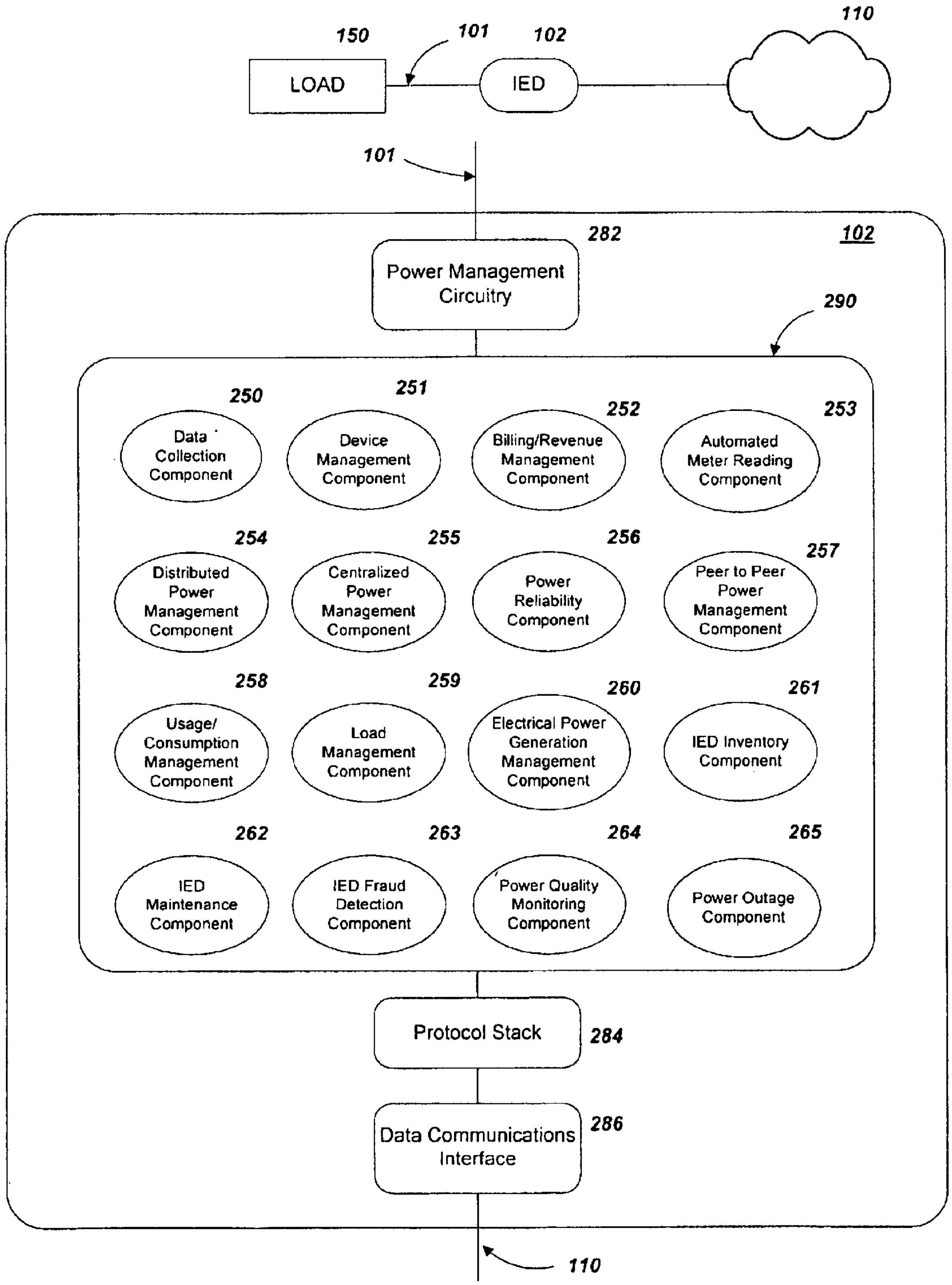
FIG. 2*b* illustrates another IED, for use with the embodiment of FIG. 1, containing several power management components.

FIG. 2*b* illustrates an alternate preferred embodiment where an IED 102 is provided which includes power management application components 290. A load 280 is connected to an IED 102 via the electrical power distribution system 101. The IED 102 is further connected to the network 110. The IED 102 contains power management circuitry which is operable to implement the IED's functionality, such as receiving power and generating data from the load 150. The IED 102 further includes a protocol stack layer 284 and a data communication interface 286 which allows the back end server 120 to communicate over the network 110. The power management application components 290 include one or more components such as data collection component 250, an automated meter reading component 253 and a billing/revenue management component 252, which may be revenue certified, a peer-to-peer power management component 257, a usage and consumption management component 258, a distributed power management component 254, a centralized power management component 255, a load management component 259, an electrical power generation management component 260, an IED inventory component 261, an IED maintenance component 262, an IED fraud detection component 263, a power quality monitoring component 264, a power outage component 265, a device management component 251, a power reliability component 256, or combinations thereof. Furthermore, components contained on one IED 102 may operate simultaneously with components on another IED 102 or back end server 120 (not shown). More component details and examples are given below.

In one embodiment the application components comprise software components, such as an email server or an XML or HTTP server. These servers may include a Microsoft Exchange server or a BizTalk framework/XML compatible server. A Microsoft Exchange™ server is an email server computer program manufactured by Microsoft Corporation, located in Redmond, Wash., typically operating on a server computer which facilitates the reception and transmission of emails, and forwards emails to the email client programs, such as Microsoft Outlook™, of users that have accounts on the server. BizTalk is a computer industry initiative which promotes XML as the common data exchange for e-commerce and application integration over the internet. BizTalk provides frameworks and guidelines for how to publish standard data structures in XML and how to use XML messages to integrate software components or programs. Alternately, hardware components, such as a dedicated cellular phone, GPS encryption or decryption key or dongle are included in the components. In a further embodiment, a combination of both hardware and software components are utilized. Additionally, referring back to FIG. 1, one or more power management application components 290 can utilize the architecture 100 to implement their functionality. For example, a utility 130 has a back end server 120 which contains power management application and associated components, such as a usage and consumption monitoring component 258. The utility 130 supplies power to a consumer 132 via the power distribution network 101 and monitors the consumers power consumption using the power management application components on the back end server 120 which communicates with the customer's IED's 102 via the network 110 to retrieve measured consumption/usage data. The consumer 132 concurrently monitors usage of loads 150 using an IED 102 which is connected to the network 110, computing real time costs posted by the utility 130. In one embodiment, the consumer 132 monitors usage using their own back end server 120 which receives usage and consumption data from the customer's IED's 102 via the network 110. The customer's IED 102 implements power management application components such as load management components and billing management components. The customer's and utility's back end servers 120 implements power management application components such as a data collection component, a billing/revenue management component, an automated meter reading component or a usage/consumption management component. The components on the IED 102 work in concert with the components on the back end server 120 via the network 110 to implement the overall power management application. In a further embodiment, one or more power management application components are operating on IED 102 and/or back end servers 120 at any given time. Each power management application can be utilized by one or more users, or different applications can be used by different users. Moreover, the application components can exist on the same or different IED's 102 or back end servers 120.

In the preferred embodiment, the data collection component 250 enables an IED 102 to collect and collate data from either a single or multiple sources via the network 110. The data collected by the component is stored and can be retrieved by other components of the power management application components 290, or other components implemented on other IED's 102 located on the network 110. In the preferred embodiment the Automated Meter Reading component 253 is utilized to allow either the consumers 132 or providers 130 to generate power management reports from the IED data. In the preferred embodiment the electrical power generation management component 260 analyzes data received from IED's 102 to either minimize or maximize measured or computed values such as revenue, cost, consumption or usage by use of handling and manipulating power systems and load routing. IED inventory, maintenance and fraud detection component 261, 262, 263 receive or request communications from the IED's 102 allowing the power management application to inventory the installed base of IED's 102, including establishing or confirming their geographic installation location, or check the maintenance history of all connected IED's 102. These power management applications aid in confirming outage locations or authenticating communications to or from an IED 102 to prevent fraud and minimize errors. In one embodiment, the IED inventory component 261 utilizes cellular triangulation technologies, or caller ID based geographic locator technologies to determine and verify IED inventories. In the preferred embodiment the fraud detection component 263 further detects device tampering. In the preferred embodiment the power quality monitoring component 264 monitors and processes electric parameters, such as current, voltage and energy which include volts, amps, Watts, phase relationships between waveforms, kWh, kvAr, power factor, and frequency, etc. The power quality monitoring component 264 reports alarms, alerts, warnings and general power quality status, based on the monitored parameters, directly to the appropriate user, such as customers 132 or utilities 130.

Figure 3A:
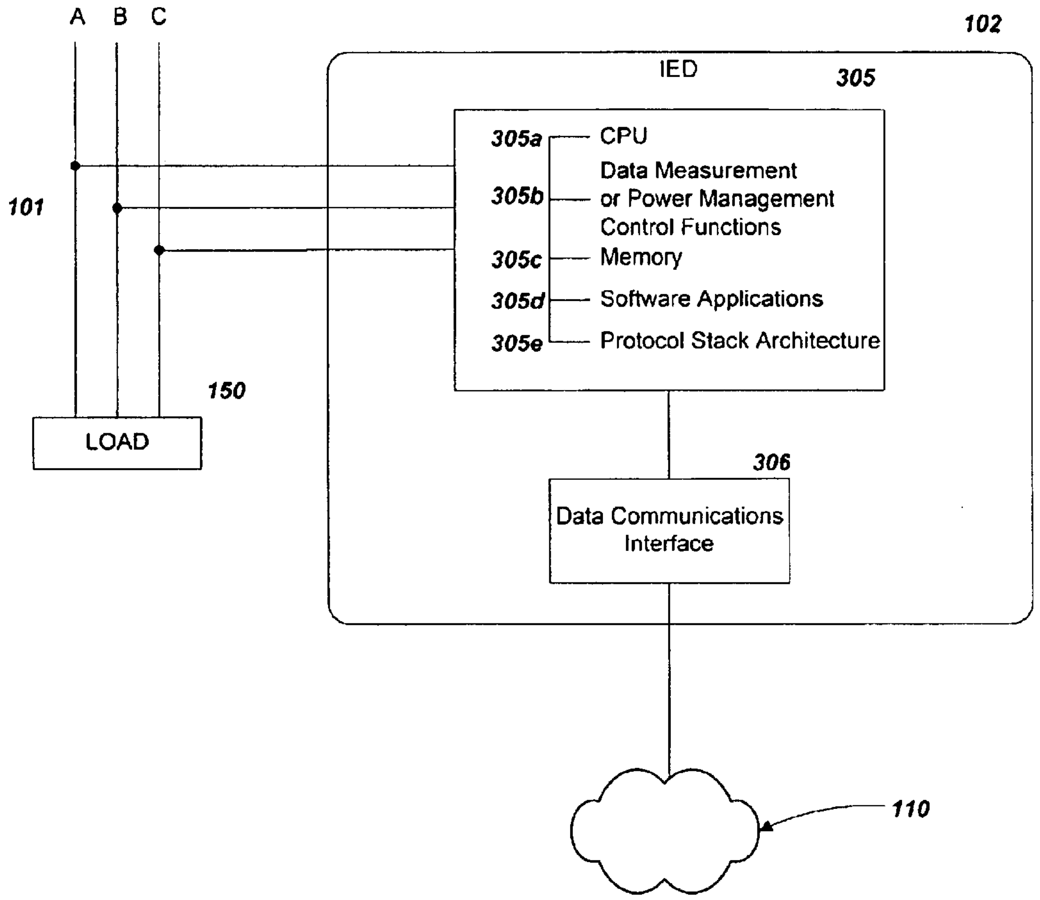
FIG. 3*a* illustrates an IED, for use with the embodiment of FIG. 1, connected to a power system.

FIG. 3*a* illustrates a preferred embodiment of an IED 102 for use with the disclosed power management architecture 100. The IED 102 is preferably coupled with a load 150 via a power a distribution system 101, or portion thereof. The IED 102 includes device circuitry 305 and a data communications interface 306. The IED 102 is further coupled with a network 110. The device circuitry 305 includes the internal hardware and software of the device, such as the CPU 305*a*, memory 305*c*, firmware and software applications 305*d*, data measurement functions 305*b* and communications protocol stack 305*e*. The data communication interface 306 couples the device circuitry 305 of the IED 102 with the communications network 110. Alternate embodiments may have power management control functions 305*b* in place of data measurement circuitry. For example, a relay may include a control device and corresponding control functions that regulate electricity flow to a load based on preset parameters. Alternately a revenue meter may include data measurement circuitry that logs and processes data from a connected load 150. IED's 102 may contain one or the other or combinations of circuitry. In an alternate embodiment the circuitry includes phasor monitoring circuits (not shown) which comprise phasor transducers that receive analog signals representative of parameters of electricity in a circuit over the power distribution system 101. Further detail and discussion regarding the phasor circuitry is discussed in U.S. patent application Ser. No. 08/798,723, captioned above.

Figure 3B:
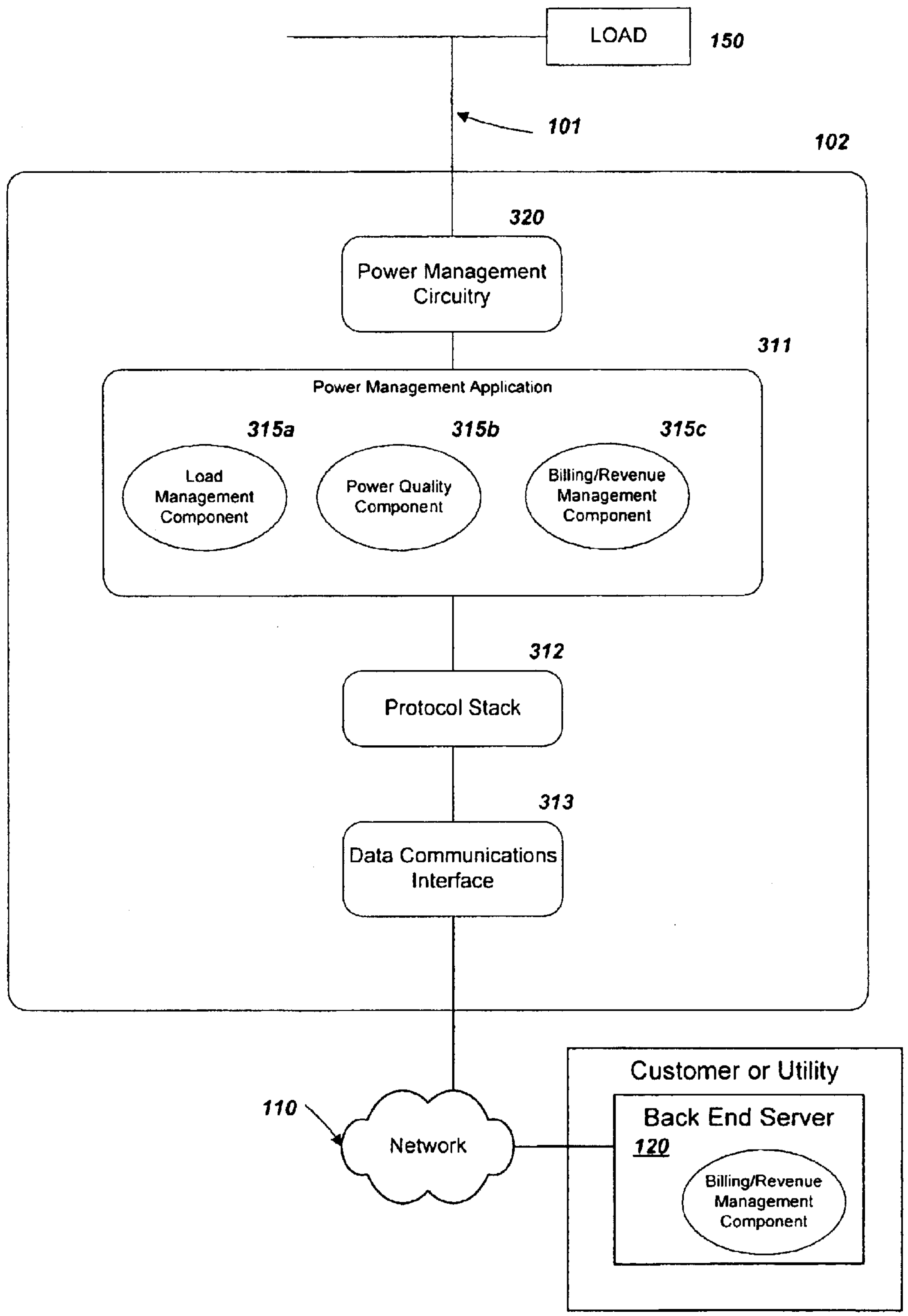
FIG. 3*b* illustrates the internal components of an IED for use with the embodiment of FIG. 1.

FIG. 3*b* illustrates a more detailed embodiment of the IED's 102 power management application components 311 and protocol stacks. The IED 102 includes power management application components 311, a communications protocol stack 312 and a data communications interface 313 (as was noted above, in alternate embodiments, the protocol stack 312 may include the data communications interface 313). The application components 311 includes a Load management component 315*a*, which measures the load's 317 consumption of electrical power from the portion of the power distribution system 101, a Power Quality component 315*b*, which measures power quality characteristics of the power on the portion of the power distribution system 101, and a billing/revenue management component 315*c*, which computes the quantity and associated value of the incoming power. The power management components are connected to the network via the data communications interface 312 using the communications protocol stack 312 (described in more detail below).

In one embodiment, a Billing/Revenue Management component on a back end server receives the billing and revenue computations over the network 307 from the billing/revenue management component 315*c* on the IED 102. These computations are translated into billing and revenue tracking data of the load 150 associated with the IED 102. The Billing/Revenue Management component on the back end server then reports the computations to the appropriate party operating that particular back end server or subscribing to a service provided by the operator the back end server, either the consumer or provider of the electrical power. Additionally, the Billing/Revenue Management component 315*c* on the IED 310 or the Billing/Revenue Management component on the back end server computes usage and cost computations and tracking data of the associated load and reports the data to the appropriate party. In a still another embodiment, IED 102 transmits billing and revenue data directly to the Billing/Revenue Management component over the network 110 and the Billing/Revenue Management component computes usage and cost computations and tracking data of the associated load and reports the data directly to the appropriate party. Furthermore, tariff data received from the utility by the Billing/Revenue Management component 315*c* is factored into usage or cost computations.

Figure 3C:
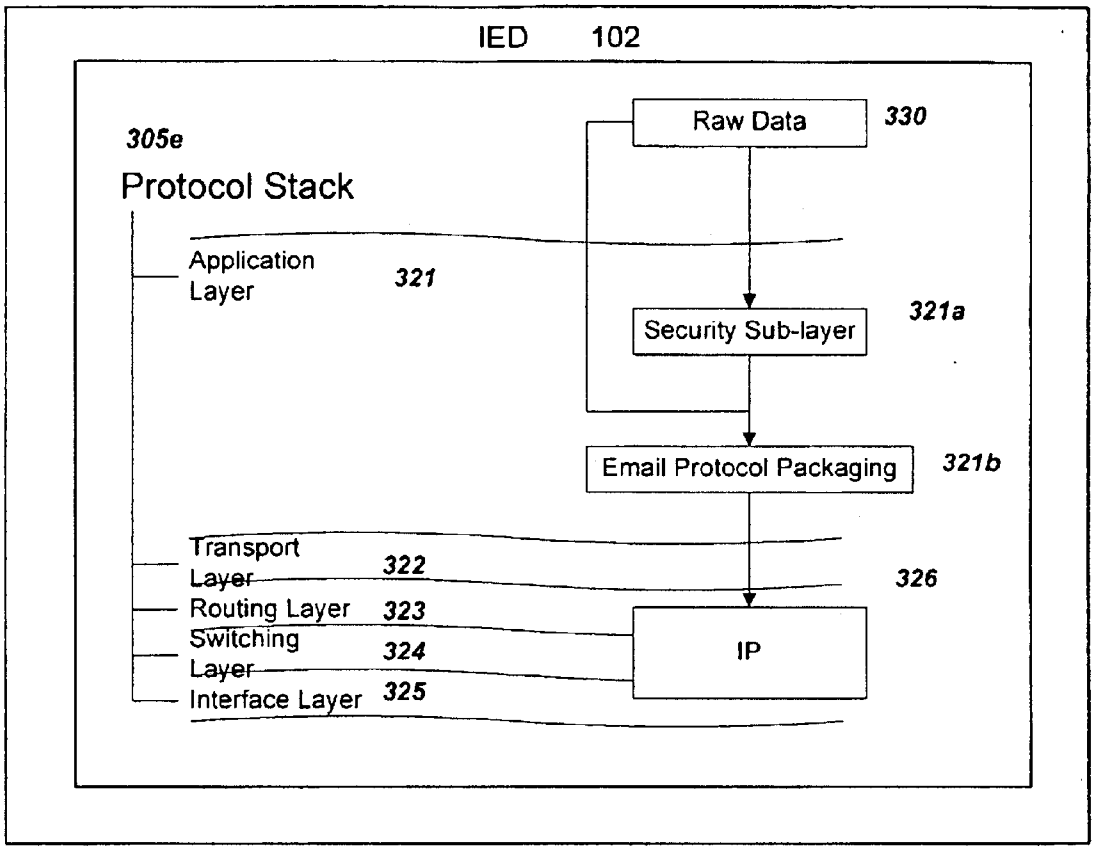
FIG. 3*c* illustrates a preferred protocol stack of an IED for use with the embodiment of FIG. 1.

FIG. 3*c* illustrates a preferred embodiment of the communications protocol stack 305*e*. In the preferred embodiment the connection between devices coupled with the network 110 is established via the Transmission Control Protocol/Internet Protocol ("TCP/IP") protocol suite. To facilitate communications over a network or other communications medium, devices typically include a set of software components known as a protocol stack. The protocol stack handles all of the details related to communicating over a given network so that other application programs executing on the device need not be aware of these details. The protocol stack effectively interfaces one or more application programs executing on the device to the network to which the device is connected. Typically, the protocol stack is arranged as a layered architecture with one or more software components in each layer. In the preferred embodiment, the protocol stack includes an application layer 321, a transport layer 322, a routing layer 323, a switching layer 324 and an interface layer 325. The application layer 321 includes all of the applications component software and/or power management component software. The application layer 321 is coupled with the transport layer 322. Applications or software components in the application layer communicate with the transport layer in order to communicate over the network. In the preferred embodiment, the transport layer is implemented as the Transmission Control Protocol ("TCP"). The transport layer, using TCP, divides communications from the applications of the application layer 321 into one or more packets for transmission across the network. The transport layer adds information about the packet sequence to each packet plus source and destination information about what application component generated the communication and to what application component on the receiving end the communication should be delivered to once reassembled from the constituent packets. The routing layer is coupled with the transport layer and is responsible for routing each packet over the network to its intended destination. In the preferred embodiment, the routing layer is implemented as the Internet Protocol ("IP") and utilizes internet protocol addresses to properly route each packet of a given communication. The switching and interface layers 324, 325 complete the protocol stack and facilitate use of the physical hardware which couples the device to the network. This hardware may include an Ethernet interface, a modem, or other form of physical network connecting including RF based connections such as Bluetooth interfaces. Generally, the preferred embodiments are capable of communicating via any network which transmits information utilizing the TCP and IP, collectively TCP/IP, protocols as are known in the art. TCP/IP is essentially the basic communication language of the both the Internet and private intranets. TCP/IP utilizes the communications protocol stack and can be described as comprising a TCP layer which manages the decomposing and reassembling of messages from the application layer 321 into smaller more manageable packets, and the IP layer which handles the addressing of the packets. The IP layer comprises the routing layer 323, the switching layer 324 and the interface layer 325. The interface layer 325, as described above, makes the physical connection with the network utilizing connections such as Ethernet, dial-up-modems, Point-to-Point Protocol (PPP), Serial Line Interface Protocol (SLIP), cellular modems, T1, Integrated Service Digital Network (IDSN), Digital Subscriber Line (DSL), Bluetooth, RF, fiber-optics or AC power line communications. In an alternate embodiment multiple interface layers 325 are present. For example, the interface layer 325 contains both an Ethernet and cellular modem thus enabling the IED to connect to the network with either interface. This redundancy is advantageous if one interface is inoperable due to a local Ethernet or cellular network outage. It is preferable that one or more of the application components in the application layer 321 implement TCP compatible protocols for the exchange of their communications over the network. Such TCP compatible protocols include the Instant Messaging protocol, file transfer protocol ("FTP"), or Hypertext Transport Protocol ("HTTP"). In addition, a Secure HTTP (S-HTTP) or Secure Socket Layers (SSL) may also be utilized between the application layer 321 and the transport layer 322 for secure transport of data when HTTP is utilized. S-HTTP is an extension to HTTP that allows the exchange of files with encryption and or digital certificates. SSL only allows authentication from the server where S-HTTP allows the client to send a certificate to authenticate to the user. The routing layer 323 and the switching layer 324 enable the data packet to arrive at the address intended.

In operation the IED monitors the power distribution system for events such as wave shape deviation, sag, swell, kWh, kvA or other power usage, consumption, or power quality events and disturbances. In one embodiment, when the IED detects an event, it process the event and generates an email message using an email client application component for transport over the network to a back end data collection server. Raw data 330, such as the error message generated from the IED or a billing signal, is passed into the application layer's 321 Security Sub-layer 321*a* where it is encrypted before email protocol packaging 321*b* takes place. Once the data 330 has been encrypted and packaged, the message is passed through the remaining IP layers where the message is configured for transmission and sent to the destination address. In one embodiment, the destination address is for a back end server implementing a data collection application component. This back end server may be operated by the consumer or supplier of electrical power or a third party as described above. In an alternate embodiment the Security Sub-layer 321*a* includes authentication or encryption, or alternately the Security Sub-layer 321*a* is bypassed. The application layer may include application components which implement protocols that are designed to pass through a firewall or other type of software that protects a private network coupled with a publicly accessible network. Multiple redundant data messages may be sent from the IP layer to ensure the complete data packet is received at the destination. In the above operation, the protocol stack, which includes an SMTP or MIME enabled email client, is a scalable, commercial product such as the Eudora™ email client manufactured by Qualcomm, Inc., located in San Diego, Calif. In an alternate embodiment data messages may also be sent to redundant destination email addresses to ensure delivery of the message. Quality of Service (QoS) may also be implemented, depending on the volume of bandwidth required for the data, ensuring reliable and timely delivery of the data. QoS is based on the concept that transmission rates, error rates, and other characteristics of a network can be measured, improved and, to some extent, guaranteed in advance. QoS is a concern for continuous transmission of high-bandwidth information. The power quality events, consumption, disturbances or other usage data may be stored in the IED and sent to the destination address upon request from an application component operating at the destination address, upon pre-determined time intervals and schedules, upon pre-defined events or in real time. In an alternate embodiment a IED may transport data or requests to or receive data or requests from other IED's directly, also know as peer-to-peer communications. Peer-to-peer is a communications model in which each party or device has the same capabilities and either party or device can initiate communication sessions.

In an alternate embodiment the Security Sub-layer 321*a* may include multiple encryption keys, each conferring different access rights to the device. This enables multiple users, such as a utility and customers, or multiple internal departments of a utility or customer, to send or receive data and commands to or from the IED 102. For example a customer's IED 102 sends out two encrypted messages, one billing data and one power quality data, to the customer's office site. The billing data message is encrypted at a level where only the internal accounting department has access to decrypt it. The power quality data message is encrypted at a different level where the entire company can decrypt the message. Furthermore, in the preferred embodiment, commands sent to or from the IED 102 are coupled with the appropriate encryption key. For example, the IED's 102 Security Sub-layer 321*a* may only permit billing reset commands to be received and processed if the command has been authenticated where the point of origin was the appropriate customer or utility. Further, encrypted email messages may also include various encrypted portions, each accessible and readable with a different encryption key. For example an IED 102 sends out one message to both the utility and the customer containing billing data and power quality data. The data is encrypted with two different encryption keys so only the utility can decrypt the power quality data and only the customer can decrypt the billing data.

In operation the IED 102 monitors the power distribution system 101 for billing events such as, kWh or kvA pulses. In one embodiment the IED 102 may store billing events and transport the data to the power management application components operating on a back end server 120 either upon request or upon pre-determined time intervals. Alternately the IED 102 may transport billing event data in real time to the back end server 120. Data may be filtered through the either the Back End Server's 120 or IED's 102 power management 110 components or any combination or variation thereof, before being entered into the Billing/Revenue Management component where billing, revenue, cost and usage tracking are computed into revised data. The Billing/Revenue Management components either stores the computations for future retrieval or pushes the revised data to the appropriate party, such as the consumer 132 or provider 130 of the electric power system 101. Data can be retrieved upon command or sent or requested upon a scheduled time.

In the preferred embodiment the back end server's operate in a similar approach to the IED's. The back end server contains a transport protocol stack and power management application components. Alternatively, a back end server could be a function or component of the IED, i.e., implemented as an application component.

Figure 4A:
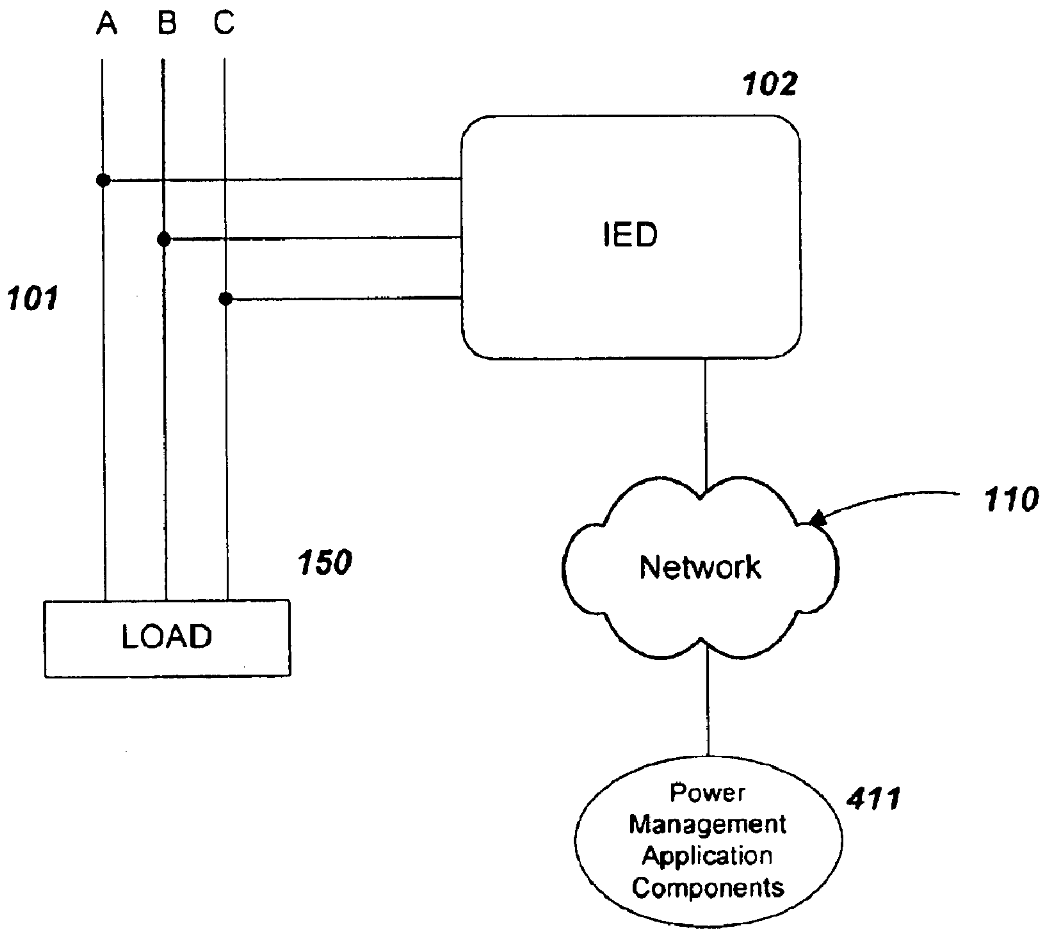
FIG. 4*a* illustrates an IED, for use with the embodiment of FIG. 1, coupled with power management components.

The IED 102 implements power management functions on the whole electrical power distribution system 101 or just a portion thereof. Referring to FIG. 4*a* the IED 102 monitors the electrical power via the system 101 to a load 150 and reports events and data to the power management application components 411 through the network 110. The power management application components 411 are preferably operating on a back end server 120. The events and data are collected and processed through the automated meter reading components, billing/revenue management components or a combination and variation thereof, and revised data or commands are sent back to the IED 102 through the network 110, enabling control of the power flow and distribution of the loading on the power distribution system 101. The automated meter reading component allows for retrieval and collection of data for the customer 132, utility 130 or third party 134. The component further allows for schedule driven, event driven or polling commands which are operable to push data onto the network 110.

Figure 4B:
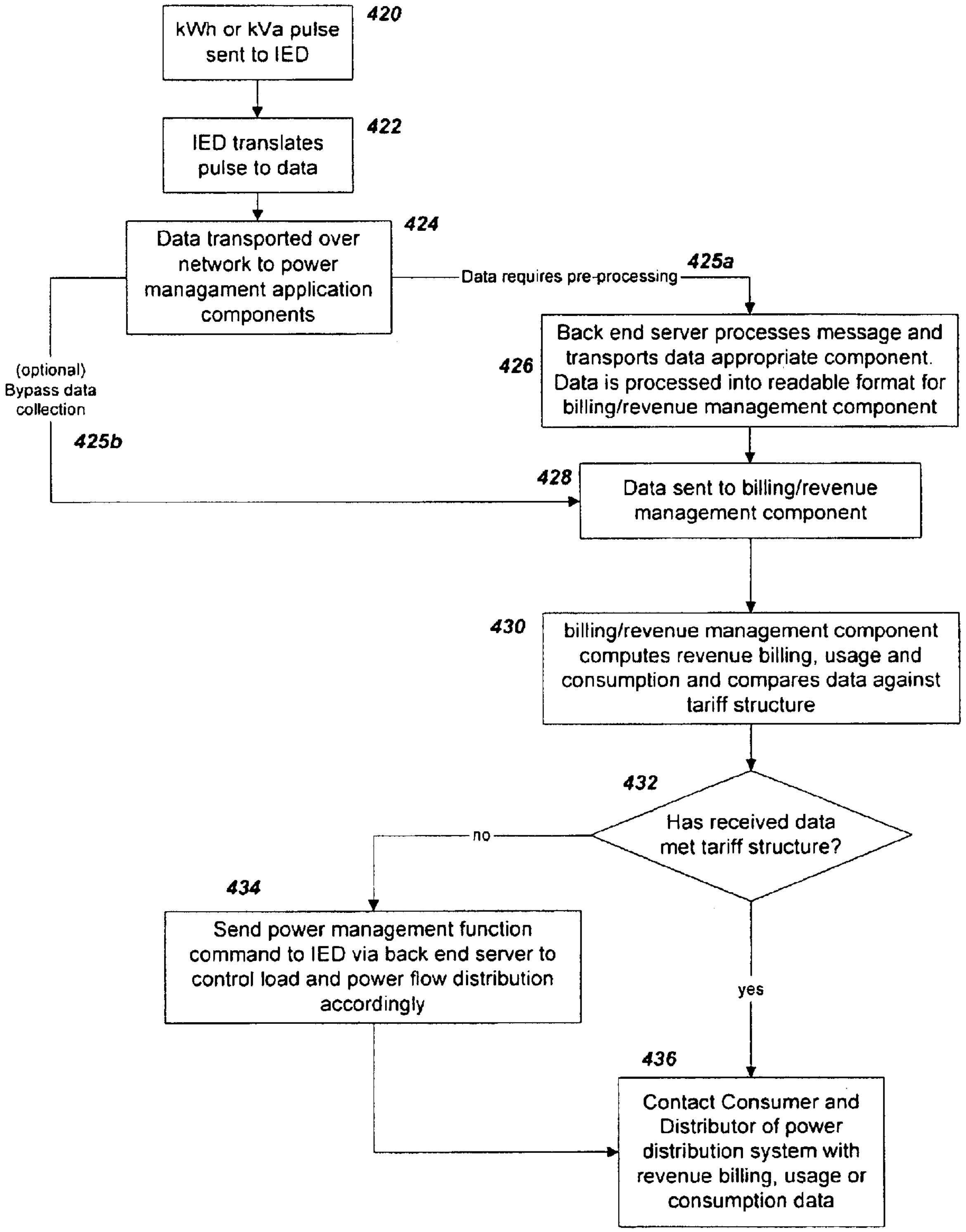
FIG. 4*b* illustrates the use of a power management application component.

The power management functions implemented by the IED's 102 enables the back end servers or IED's 102 to control power flow and distribution over the electrical power distribution system. Specifically the power management application components process power measurement data and generate power measurement and reporting commands, transmitting them to the back end servers or IED's 102 for execution. Referring now to FIG. 4*b*, in one preferred operation a load is monitored by a IED 102 where kvA and kWh pulse data are sent in real time over the network 110 to the Application via email or another transport protocol. If pre-processing is required 425*a* the raw pulse data is transported into a data collection server or component where it is translated into a format readable by the billing/revenue management component 426. Alternately, the billing/revenue management component may be configured to receive and process data without pre-processing 425*b*. Once sent to the billing/revenue management component 428 the data is compared and analyzed for usage, consumption or billing revenue ranges against a pre-determined tariff structure (430, 432 in FIG. 4*b*) where any anomalies, excess or shortages are reported back to the IED 102 in the form of a command to a power management function which controls the power flow and load distribution accordingly 434. The components further contact the required parties, such as the consumer 132 or provider 130 of the load 150, over the network 110, forwarding power quality, billing, usage or consumption reports or any power management functions that were required against the set tariff structure (436 in FIG. 4*b*).

Figure 5A:
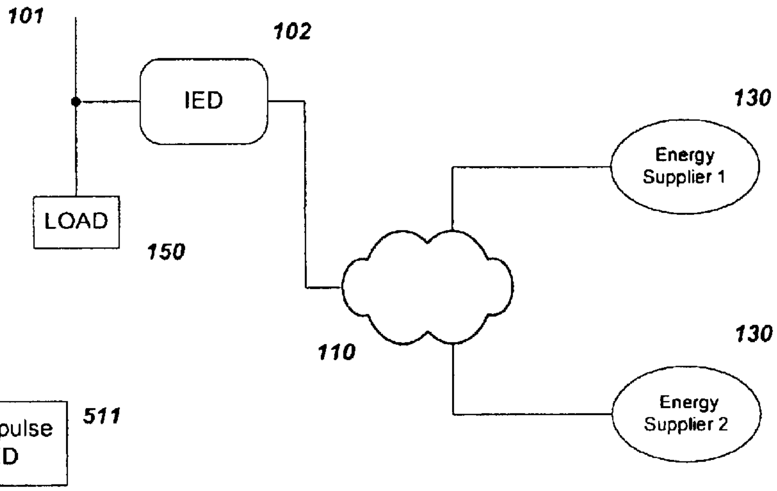
FIG. 5*a* illustrates a preferred embodiment with multiple energy suppliers.
Figure 5B:
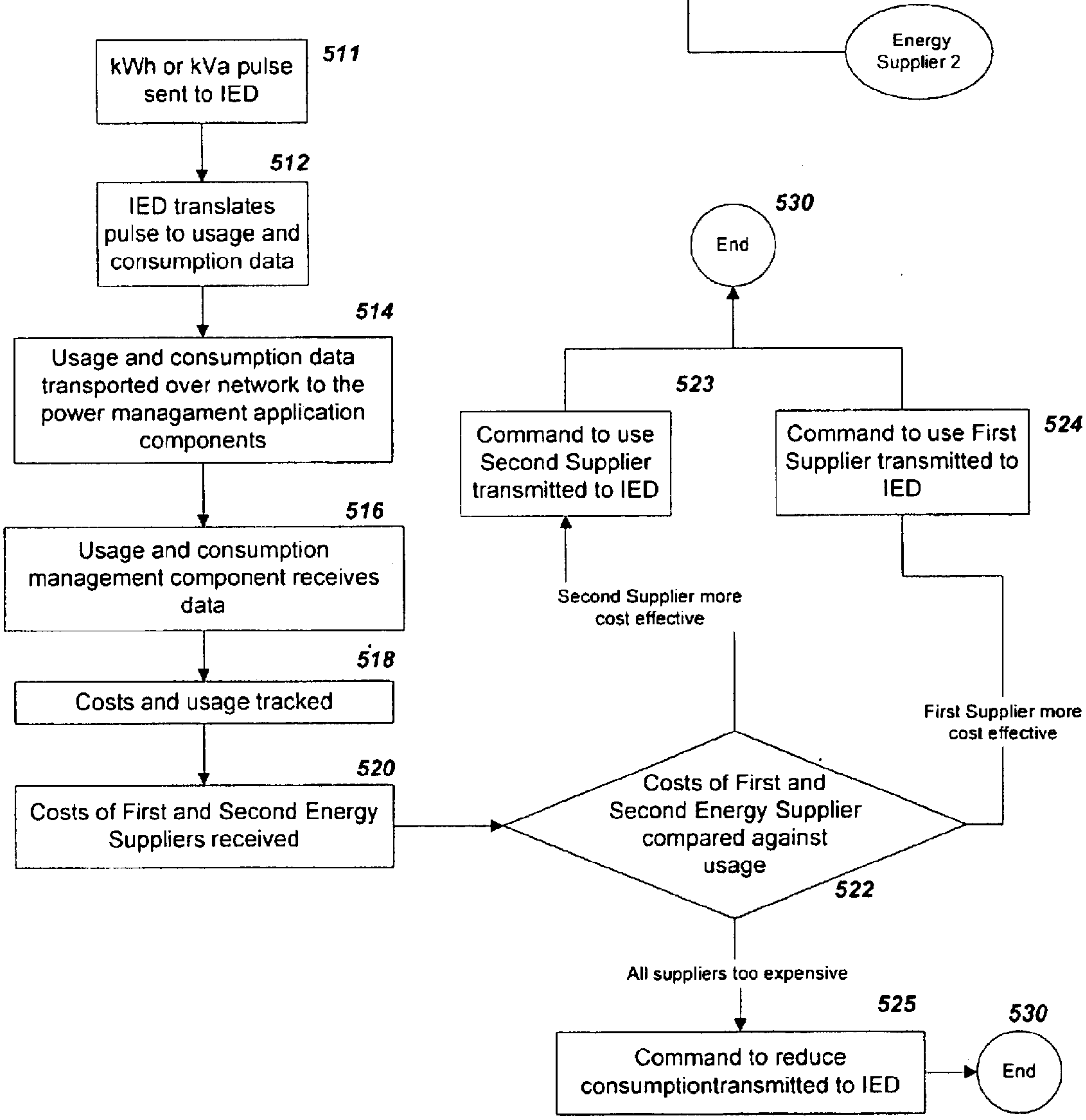
FIG. 5*b* illustrates a preferred method of managing multiple suppliers for use with the embodiment of FIG. 1.

FIG. 5*a* illustrates a preferred embodiment for a usage and consumption management application of the power management architecture. The IED 102 implements a power management function of controlling the source of electrical power for the load 150 from either energy supplier 1 130 or energy supplier 2 130. The application is designed to take advantage a deregulated marketplace and operate the load 150 from the most cost efficient energy supplier 130 at the given time period. Which supplier 130 is most efficient may fluctuate frequently as a function of the energy market and supply and demand for electrical power. Referring to FIG. 5*b*, the IED 102 contains a usage and consumption management component which receives tariff and cost structures from multiple energy suppliers 130. The component receives usage and consumption from the Load 150 and compares actual usage against multiple tariff structures choosing the most cost effective provider for a given load. Similarly the load management component 259, as shown in FIG. 2*b*, is utilized to connect and disconnect loads to and from the electrical distribution system during either low and high rate and demand periods, hence reducing the electrical power costs and demand. In the preferred embodiment the load management component 259 is programmed to run in an automated fashion based on feedback from the system, however in an alternate embodiment the component is operated manually based on user input.

For example, an IED 102 is connected to a power line 101 and associated load 501. The IED 102 measures power usage by the load 150 (511, 512 FIG. 5*b*) and transmits this consumption data 514 over a network 110 to a usage and consumption management application component operating on a back end server 120 (not shown). The Usage and consumption management component receives and tracks cost and usage 516, 518 and compares rates for actual usage against multiple suppliers 130 bids 522. Suppliers 130 have the option to either push tariff structures to the application component or have tariff structures polled over the network 110. Once the most cost effective structure is determined by the usage and consumption management component, a command or function is sent to the IED 102 with the new tariff structure 523, 524. Alternately, the new tariff structure is applied across to the billing/revenue management component where billing is applied to the usage and revenue reports are forwarded onto the appropriate parties.

In another example the usage and consumption management component determines all suppliers tariff structures are too expensive to warrant usage or consumption thus a command to reduce consumption to a desired level is transmitted over the network 110 to the IED 102. Furthermore, an alternate embodiment includes application of real-time usage and cost monitoring of loads being measured by an IED 102 and multiple energy and distribution system suppliers 130.

In an alternate embodiment the usage and consumption component is preprogrammed to monitor and shed loads based on a exceeding a set tariff structure. For example an IED 102 monitors a load 150 connected to a power distribution system 101. Energy is supplied by an energy supplier 130. The IED 102 contains a tariff structure that has a limit of $0.80/kWh during peak hours of 6 am to 6 pm and a limit of $0.60/kWh for non-peak hours of 6 pm to 6 am. The IED 102 monitors the power usage of the load 150 vs. the actual tariff structure of the energy supplier and shuts the load 150 off if the actual tariff exceeds the limits of $0.80/kWh during peak times or $0.60/kWh during non-peak times.

The centralized power management component 255 allows the centralization of work at one location, such as a centralized billing server, load management server or master IED, which collects and processes data from various devices spread over the network. In operation, remote IED's connected to the network transmit data to the centralized power management component where operations such as billing, load management, usage and consumption reporting are processed in one central location.

Figure 6:
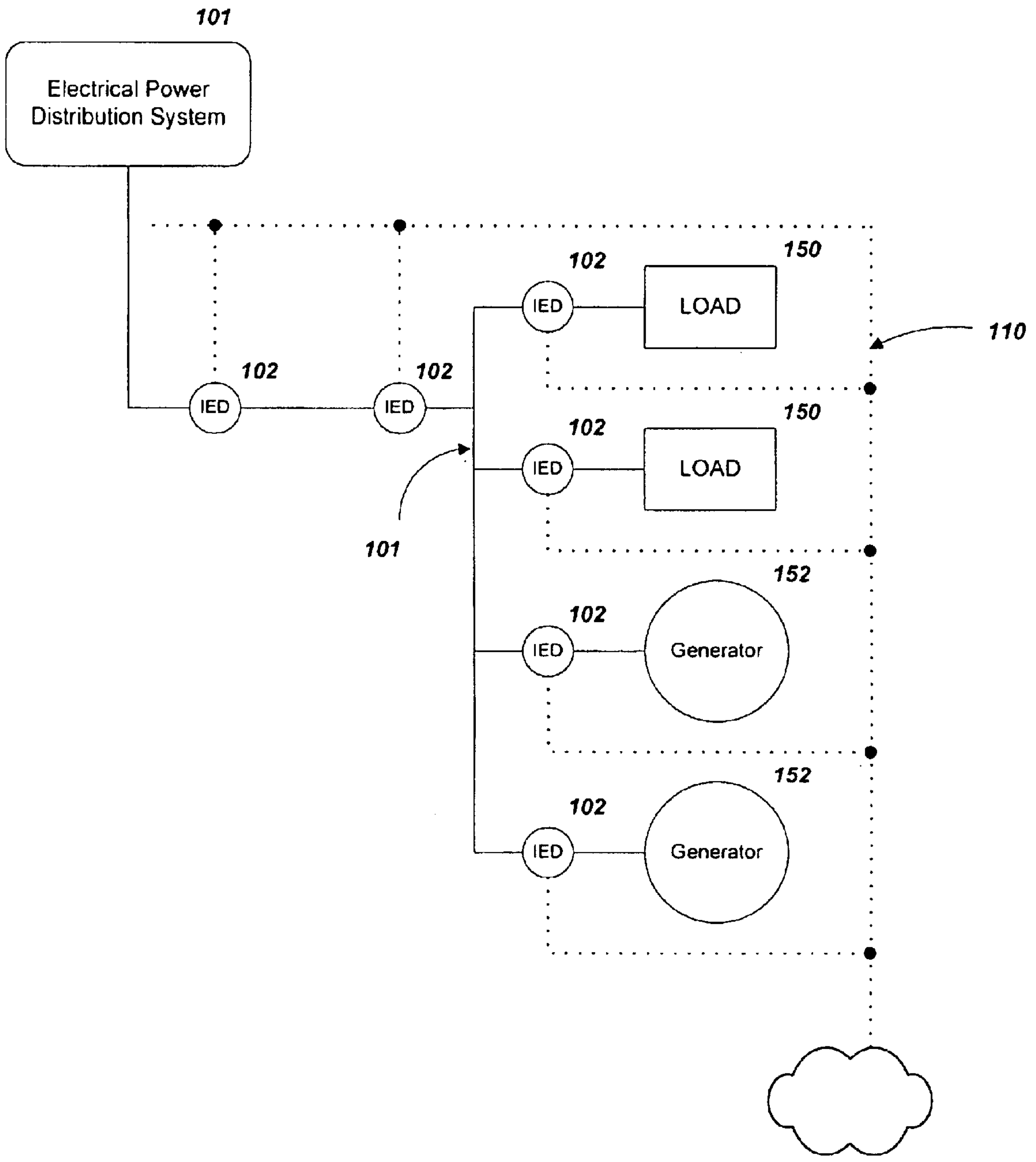
FIG. 6 illustrates a second embodiment using a distributed power management component.

The distributed power management component 254 allows for the distribution of work or data processing to various devices on the network. In operation, an IED 102 measures or detects an occurring or impending catastrophic power quality event and alerts other downstream IED's 102 (on the power distribution network 101) of the event thereby giving the downstream IED's 102 an opportunity to disconnect or alter loads 150 before the event reaches the downstream system and causes damage. The component further includes a function that, upon detection of an occurring or impending event, alerts downstream IED's 102 or back end servers 120 to alert their connected loads 150 to either protect themselves from the outage by shutting down, or instructing them to shut down applications that may cause critical failure or damage if interrupted, such as writing to a hard-drive. FIG. 6 illustrates a preferred embodiment of the distributed power management component in action. An Electrical power distribution system 101 distributes energy over distribution lines 601 which are connected to multiple IED's 102 which are present to continuously monitor the energy being fed onto their respective loads 150 and generators 152 on a given branch and furthermore all IED's 102 are connected via a network 610 as described above. IED's 102 are also present on the distribution system 101 to continuously monitor energy being transferred onto the system 101 as a whole. It will be appreciated that the loads 150 and generators 152 may reside on multiple or separate consumer 132 sites. In operation, a catastrophic power quality event is detected on a load 150 by the attached IED 102. The IED 102 takes appropriate action, such as triggering a protection relay (not shown), on the load 150 and further transmits communications of its actions to upstream IED's 102. This ensures local containment of the event by the "detecting" IED 102 informing upstream IED's 102 to not duplicate the action on the larger system 101. Obviously retaining upstream IED's 102 as a backup is not discounted in this operation. Alternatively, the operation is utilized to coordinate downstream IED's 102 over the network 110. For example an event may be detected at the distribution system 101 by an IED 102 monitoring the system 101 which triggers, for example, a protection relay. The IED 102 which triggered the protection relay (not shown) communicates its actions to downstream IED's 102 over the network 110 allowing them to take appropriate intelligent action, such as disconnection the generators 152. It can be appreciated that IED 102 applications may include a combination of the centralized and distributed power management components.

In one embodiment, a power reliability component 256 is provided in the IED to measure and compute the reliability of the power system. Power system reliability is discussed in commonly assigned U.S. patent application Ser. No. 09/724,309, now U.S. Pat. No. 6,671,654, "APPARATUS AND METHOD FOR MEASURING AND REPORTING THE RELIABILITY OF A POWER DISTRIBUTION SYSTEM", captioned above. In the preferred embodiment the component 256 computes and measures reliability as a number of "nines" measure. The component includes a function which compiles the reliability of the power from other components located on back end servers 120 or IED's 102, giving a total reliability. This function also enables a user to determine which part of the distribution system has the most unreliable power. Knowing this enables the user to focus on the unreliable area, hopefully improving local power reliability and thus increasing overall reliability.

Figure 7:
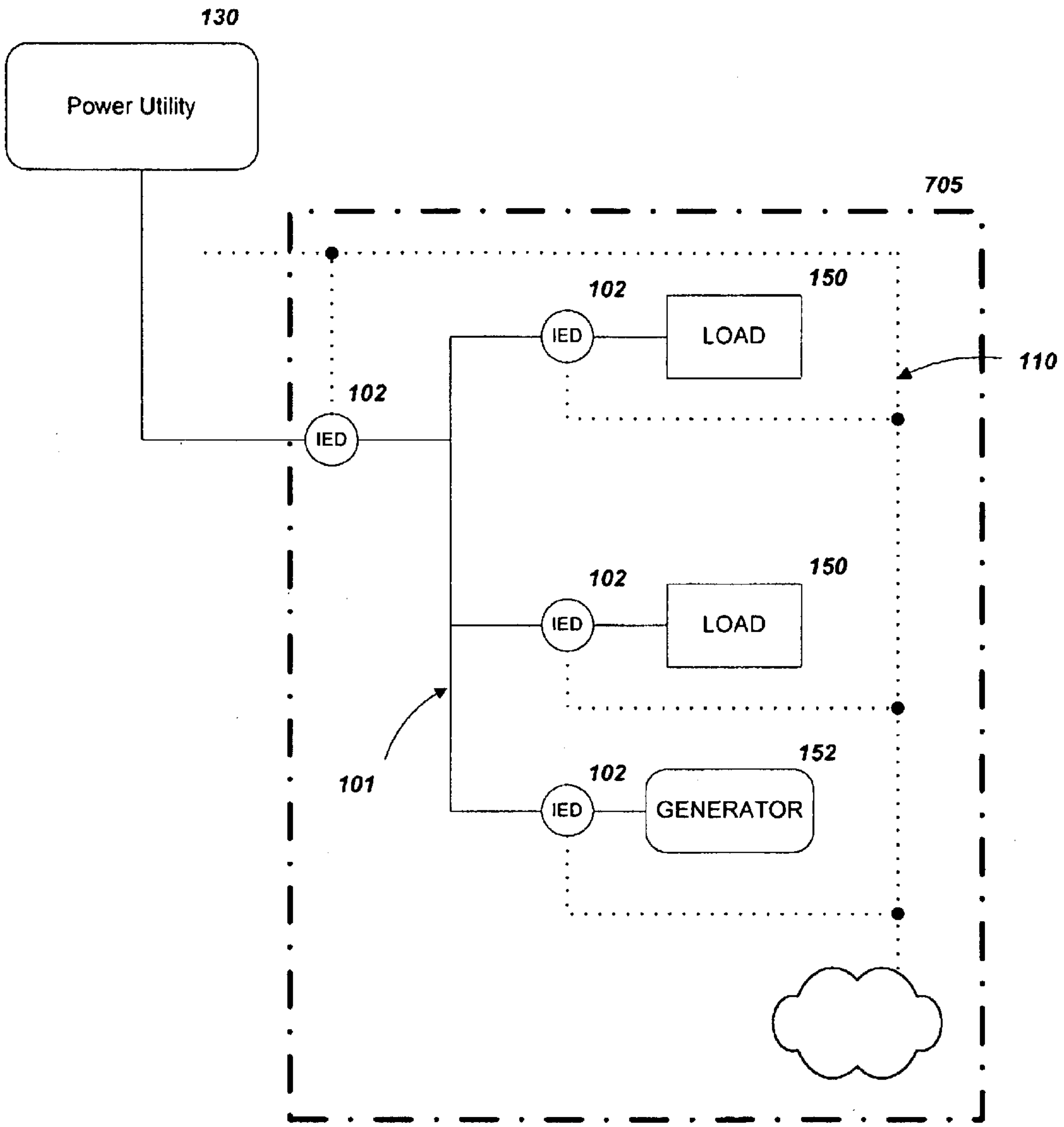
FIG. 7 illustrates a third embodiment using a power reliability component.

For example, referring now to FIG. 7, an IED 102 is connected to a network 110 and measures the reliability of the power distribution system 101 which supplies power to loads 150 within a customer 132 site 705. The customer 132 also provides a generator 152 which supplies power to the loads 150 at various times. The customer 132 measures the power reliability of the system 101 for the load 150 using the associated IED 102 and considers it unreliable. One IED's 102 power reliability component polls the other IED's 102 and determines the unreliable power source is coming from the generator 152. From this the customer can decide to shut off the power supply from the generator 152 in order to improve the power reliability of the system 101.

In another embodiment, a power outage component 265 is provided in the IED which informs the appropriate parties of a power outage using email or other transport protocols. In the preferred embodiment an IED is connected to a power system when a power failure occurs. The IED's power outage component 265 contains hardware, such as a battery backup and modem, which enables the IED to transmit a power failure warning to the appropriate parties, such as the utility or customer, such as by email over a network as described above. Further, a cellular modem may be utilized to call out to indicate the location of an outage. Physical locating algorithms such as cellular triangulation or telephone caller ID can be used to track or verify outage locations.

Figure 8:
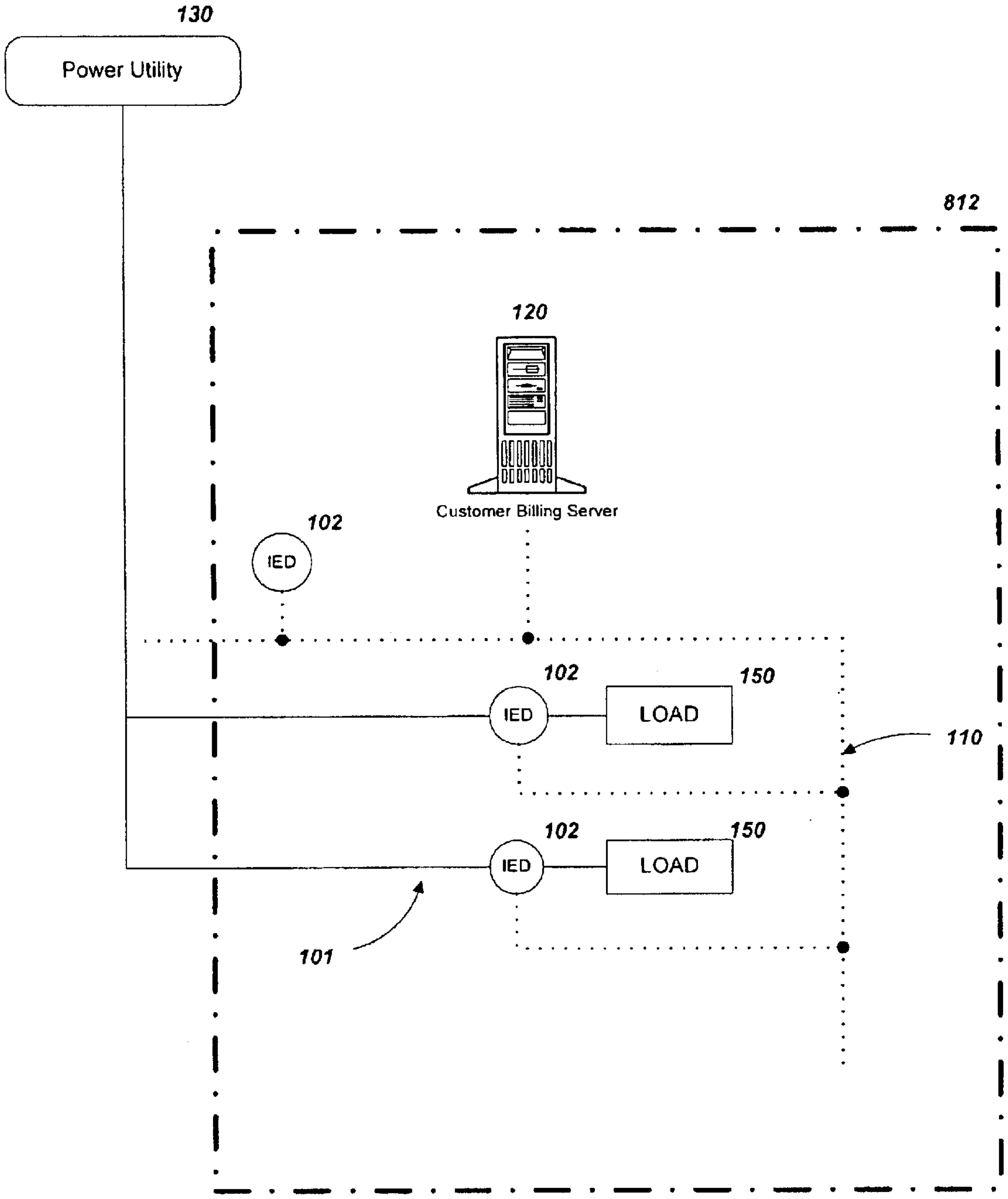
FIG. 8 illustrates a fourth embodiment using a peer to peer component.

Peer to peer communications between IED's 102 and between back end servers 120 are supported by the peer to peer management component 257. In the preferred embodiment peer to peer communications are utilized to transport or compile data from multiple IED's 102. For example, as shown in FIG. 8, an IED 102 is connected to a network 110. Multiple loads 150 draw power from a power utility's 130 power distribution line 101 and each load 150 is monitored by an IED 102. An IED 102 polls load and billing data from all other IED's 102 on the network 110 on the customer 132 site 802, 804. Upon request, the IED 102 then transmits the load and billing data to the customer's billing server 120. In the preferred embodiment, the IED 102 communicates the load and billing data in a format which allows software programs inside the customer billing server 120 to receive the data directly without translation or reformatting.

Transmission of data in XML format allows a user to receive the data in a readable self-describing format for the application intended. For example, traditional data file formats include comma-separated value files (CSV), which contain values in tables as a series of ASCII text strings organized so each column value is separated by a comma from the next column's value. The problem with sending CSV file formats is the recipient may not be aware of each column's desired meaning. For example, a CSV file may contain the following information sent from a revenue billing application 45.54,1.25,1234 Elm Street, 8500 where 45.54 is the kWh used this month, 1.25 is the kWh used today, 1234 Elm Street is the location of the device and 8500 is the type of device. However, if the recipient of the CSV file was not aware of the data format, the data could be misinterpreted. A file transported in XML is transmitted in HTML tag type format and includes information that allows a user or computer to understand the data contained within the tags. XML allows for an unlimited number of tags to be defined, hence allowing the information to be self-describing instead of having to conform to existing tags. The same information is transmitted in XML format as:

<billing[ ]_information>

<kWh[ ]_month>45.54</kWh[ ]_month>

<kWh[ ]_day>1.25</kWh[ ]_day>

<location>1234 Elm Street</location>

<device[ ]_type>8500</device[ ]_type>

</billing[ ]_information>

Figure 9:
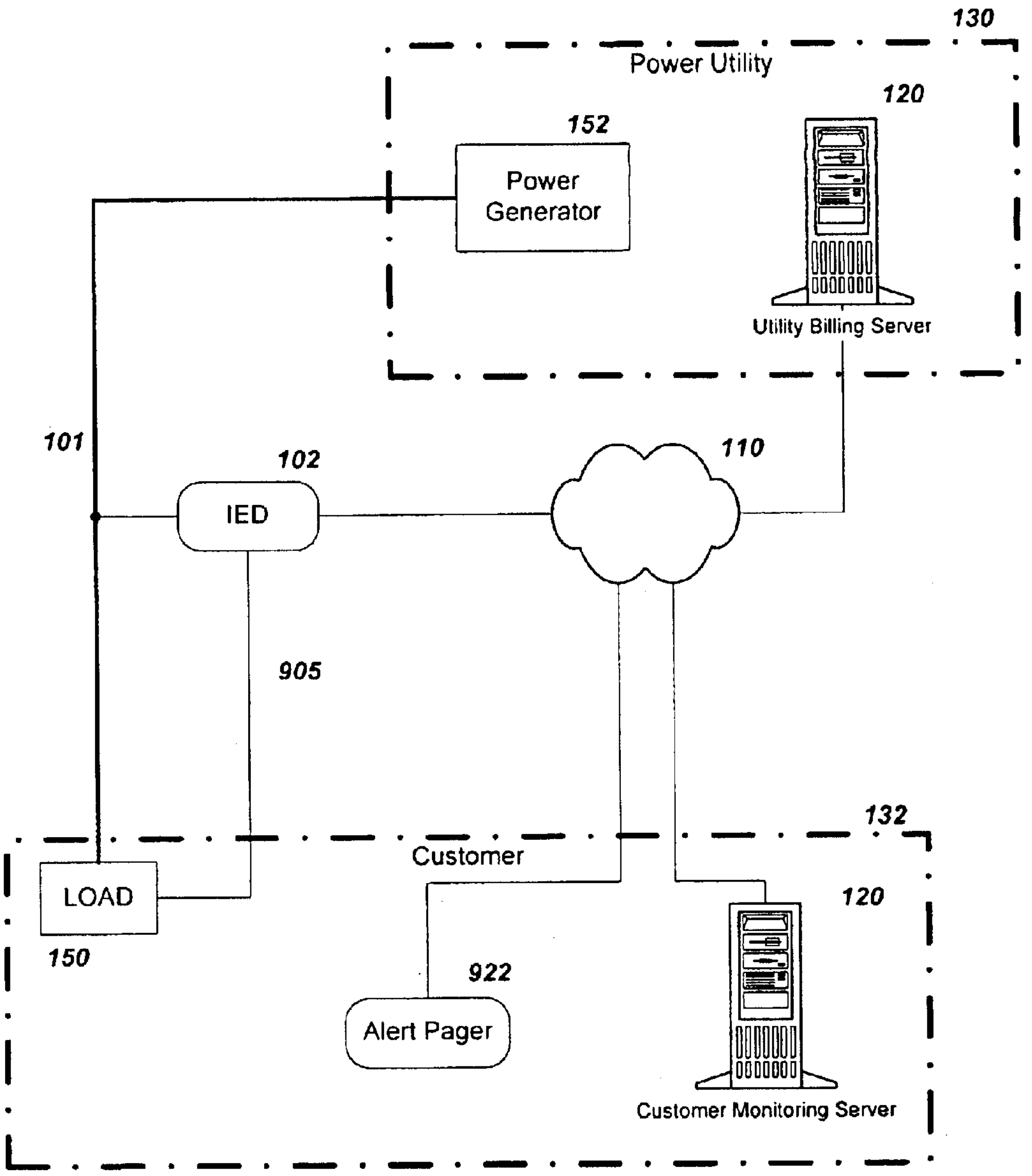
FIG. 9 illustrates an IED, for use with the embodiment of FIG. 1, transmitting data to multiple recipients.

Transmission in XML format allows the recipient to receive XML-tagged data from a sender and not require knowledge of how the sender's system operates or data formats are organized. In a preferred embodiment, communications between IED's 102 connected to the network 110 are transmitted in XML format. An IED 102 utilizes XML based client application components included within the power management applications and transmits the data in XML format so little or no post-processing is required. FIG. 9 illustrates an example of the preferred embodiment. An IED 102 is connected to a power distribution line 101 and associated load 150 owned by a customer 132. Power is supplied by a power utility's 130 power generator 152. The power utility 130 also has a utility billing server 120 which compiles billing data from consumers 132 drawing power from their power generators 152. The IED 102 is connected to the utility billing server 120 via a network connection 110 and the IED 102 measures usage and consumption of the load 150, and other values associated with billing. The utility billing server 120 contains billing software, such as a MV90, which requires data in a specified format. Either upon request, or a pre-scheduled times, the IED 102 transmits the usage, consumption and billing data associated with the load 150 to the utility billing server 120 in XML format. The customer 130 also has a monitoring server 120 which is dedicated to receiving billing data from the IED 102 and reporting usage and consumption to the appropriate parties, the monitoring server 120 also reads data in a specified format for its associated monitoring software. The IED 102 transmits the same usage, consumption and billing data to the monitoring server 120 in XML format. By utilizing XML data formats the data transmitted by the IED 102 can be read by multiple servers or IED's 102 that do not require knowledge beforehand of the order or type of data that is being sent. In an alternate embodiment an IED 102 may also receive inputs from peripheral devices which may be translated and combined in the XML transmission. For example, the load 150 is a motor which contains a temperature probe. The temperature probe is connected to the IED 102 and allows the IED 102 to monitor the motor temperature in addition to power data on the power distribution line 101. The IED 102 is programmed to act on the temperature input by shutting down the motor if the temperature exceeds a pre-defined critical level by tripping a relay or other protection device (not shown). The IED 102 is further programmed to alert the customer monitoring server 120 and an alert pager 922 and if such an action takes place. This alert transmission is sent in XML format so both the server 120 and the pager 922, which may be configured to read incoming transmissions differently, receive the alert transmission in the form it was intended. It can be appreciated that the IED 102 can receive data in XML format from multiple sources without complete knowledge of their file transfer notations.

Figure 10:
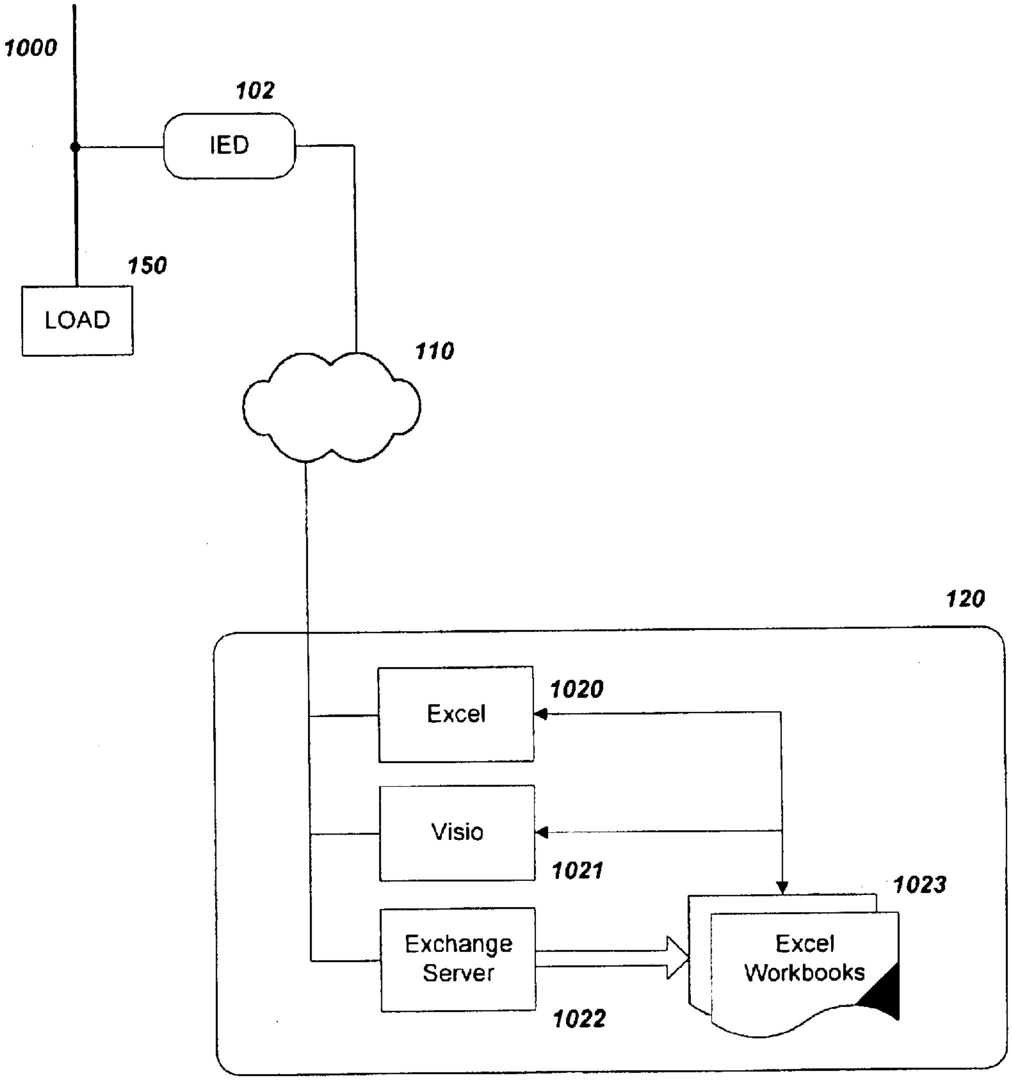
FIG. 10 illustrates a monitoring server, for use with the embodiment of FIG. 1, receiving data from an IED.

In an alternate embodiment the back end servers 120 include software that is generally included on a majority of existing computer systems, such as Microsoft Office™ software, manufactured by Microsoft Corporation, located in Redmond, Wash. which includes the software applications Microsoft Word™ and Microsoft Excel™. The software receives data in a self describing format, such as XML, and the software includes off the shelf applications and processes such as a Microsoft Exchange Server, Microsoft Excel and associated Excel Workbooks, Microsoft Outlook and associated Outlook rules, Microsoft Visio and associated Visio Stencils, Template files, and macros which allow the user to view and manipulate data directly from the IED 102. In one embodiment the IED 102 transmission format makes use of existing standard software packages and does not require additional low level components, such as a communications server communicating with a serial port, which are normally required to interface to the IED 102 communication ports. Further, the embodiment does not require a separate database, as the data is stored in the software programs. This allows a user to view data from the IED 102 using standard computer software. For example, referring now to FIG. 10, an IED 102 monitors a load 150 and passes the monitored data to a monitoring server 120. The data can be transmitted using a variety of protocols, such as FTP, TCP/IP or HTTP, as described above. In the preferred embodiment data is transmitted in an HTTP based form or an SMTP form where the HTTP form is a self-describing format such as XML and the SMTP format is an email message. The monitoring server 120 includes Microsoft Exchange Server 1022, Visio 1021, Microsoft Excel 1020 and Excel Workbooks 1023. The Excel software 1020 is capable of receiving data directly from the IED 102 in a self-describing format, thus allowing the user to view real time load profiles or graphs and other monitored data directly from the IED 102 in real time. The Visio software 1021 is also capable of receiving data directly from the IED 102 in a self-describing format, thus allowing the user to process and view real time data in Visio format. Alternately, the IED 102 transmits power quality, load, billing data or other measured or monitored values to the Excel Workbooks 1023 via the Exchange Server 1022. The Excel or Visio software is then capable of retrieving historical data directly from the workbooks.

Referring to FIG. 11, there is shown an exemplary screen display of a Microsoft Excel worksheet which is coupled with the IED 102 as described above. In this example, the IED 102 is a model 8500 meter, manufactured by Power Measurement Limited, in Victoria, British Columbia, Canada. The IED 102 is coupled via a TCP/IP based network with a personal computer having at least 64 MB memory and 6 GB hard disk with a Pentium™ III or equivalent processor or better, executing the Microsoft Windows 98™ operating system and Microsoft Excel 2000. The computer further includes Microsoft Internet Explorer™ 5.0 which includes an XML parser that receives and parses the XML data from the meter and delivers it to the Excel worksheet. The worksheet displays real time data received directly from the IED 102 in an XML format. As the IED 102 detects and measures fluctuations in the delivered electrical power, it transmits updated information, via XML, to the Worksheet which, in turn, updates the displayed data in real time. Note that all of the of the Microsoft Excel program are available to manipulate and analyze the received real time data, including the ability to specify mathematical formulas and complex equations which act on the data. Further, display templates and charting/graphing functions can be implemented to provide meaningful visual analysis of the data as it is received. Further, the real time data can be logged for historical analysis. In one embodiment, the activation of a new IED 102 on the network is detected by the worksheet which cause automatic generation of a new worksheet to receive and display data from the new device.

As described above, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

It is therefore intended that the foregoing detailed description be regarded as illustrative rather than limiting, and that it be understood that it is the following claims, including all equivalents, that are intended to define the spirit and scope of this invention.

We claim:

1. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

a security module coupled with said first network interface and operative to prevent unauthorized access to said power management data;

said architecture further comprising:

a power management application coupled with said network and operative to receive and process said power management data from said at least one IED and generate said at least one power management command to said at least one IED to implement said power management function, said power management application further comprising a power quality monitoring application;

wherein said security module is further operative to augment said power management data transmitted onto said network with authentication data and authenticate said at least one power management command received from said network and said power management application comprises an authentication application operative to augment said at least one power management command transmitted onto said network with authentication data and authenticate said power management data received from said network.

2. The electrical power management architecture of claim 1, wherein said security module is further operative to encrypt power management data generated by said at least one IED onto said network and decrypt at least one power management command received by said at least one IED from said network and wherein said power management application comprises an encryption application operative to encrypt said at least one power management command transmitted onto said network and decrypt said power management data received from said network.

3. The electrical power management architecture of claim 2, wherein said security module and said encryption application comprises pretty good privacy ("PGP").

4. The electrical power management architecture of claim 2, wherein said security module and said encryption application comprises prime number based encryption algorithms.

5. The electrical power management architecture of claim 2, wherein said encryption application comprises elliptical curve based encryption algorithms.

6. The electrical power management architecture of claim 2, wherein said at least one power management command and said power management data each comprise first and second portions, said first portion associated with a first encryption key and said second portion associated with a second encryption key, and wherein said first key is operative to allow access to said first portion only and said second key is operative to allow access to said second portion only.

7. The electrical power management architecture of claim 6, wherein said first portion includes said second portion.

8. The electrical power management architecture of claim 1, wherein said power management application is capable of substantially simultaneously receiving power management data from a plurality of said at least one IED.

9. The electrical power management architecture of claim 1, wherein said power management application comprises a data collection server coupled with said network and operative to receive said power management data.

10. The electrical power management architecture of claim 9, wherein said data collection server is operated by a customer of said electrical power distribution system.

11. The electrical power management architecture of claim 9, wherein said data collection server is operated by a provider of said electrical power distribution system.

12. The electrical power management architecture of claim 9, wherein said power management data is transmitted as electronic mail messages, said data collection server further comprising an electronic mail server.

13. The electrical power management architecture of claim 12, wherein said data collection server is further operative to receive said electronic mail messages and automatically extract said power management data into a database coupled with said data collection server.

14. The electrical power management architecture of claim 9, wherein said power management data is transmitted in hypertext transfer protocol format, said data collection server further comprising a hypertext transfer protocol server.

15. The electrical power management architecture of claim 9, wherein said power management data is transmitted as data files, said data collection server further comprising a file transfer protocol server.

16. The electrical power management architecture of claim 9, wherein said power management data is transmitted in extensible markup language format, said data collection server further comprising an extensible markup language server.

17. The electrical power management architecture of claim 9, wherein said data collection server further comprises a phasor processor.

18. The electrical power management architecture of claim 1, wherein said at least one IED further comprises a revenue meter and said power management application further comprises a peer to peer power management application.

19. The electrical power management architecture of claim 1, wherein said power management application further comprises an electric power generation management application.

20. The electrical power management architecture of claim 1, wherein said power management application further comprises a load management application.

21. The electrical power management architecture of claim 20, wherein said load management application is operative to connect and disconnect loads to/from said electrical power distribution system.

22. The electrical power management architecture of claim 21, wherein said load management application is further operative to disconnect loads during high rate periods and connect loads during low rate periods to reduce electrical power costs.

23. The electrical power management architecture of claim 21, wherein said load management application is further operative to disconnect loads during high demand periods and connect loads during low demand periods to reduce electrical power demand.

24. The electrical power management architecture of claim 1, wherein said electrical power distribution system comprises a utility electrical power distribution network.

25. The electrical power management architecture of claim 1, wherein said electrical power distribution system comprises a consumer electrical power distribution network.

26. The electrical power management architecture of claim 1, wherein said network comprises a publicly accessible communications network.

27. The electrical power management architecture of claim 1, wherein said network comprises a Transport Control Protocol/Internet Protocol ("TCP/IP") based network.

28. The electrical power management architecture of claim 27, wherein said network further comprises the Internet.

29. The electrical power management architecture of claim 27, wherein said network comprises an intranet.

30. The electrical power management architecture of claim 1, wherein said at least one IED comprises an electric meter.

31. The electrical power management architecture of claim 1, wherein said at least one IED comprises a revenue meter.

32. The electrical power management architecture of claim 1, wherein said at least one IED comprises an a protection relay.

33. The electrical power management architecture of claim 1, wherein said at least one IED comprises:

a legacy electric meter; and a monitoring and control device coupled with said legacy electric meter, said monitoring and control device comprising said first network interface.

34. The electrical power management architecture of claim 1, wherein said at least one IED comprises a phasor transducer.

35. The electrical power management architecture of claim 1, wherein said power management function comprises monitoring at least one electrical power parameter of said portion of said electrical power distribution system.

36. The electrical power management architecture of claim 35, wherein said monitoring comprises monitoring by a supplier of electrical power.

37. The electrical power management architecture of claim 35, wherein said monitoring comprises monitoring by a consumer of electrical power.

38. The electrical power management architecture of claim 35, wherein said power management function further comprises computing revenue.

39. The electrical power management architecture of claim 38, wherein said power management function further comprises reporting said computed revenue.

40. The electrical power management architecture of claim 35, wherein said power management function further comprises computing usage.

41. The electrical power management architecture of claim 40, wherein said power management function further comprises reporting said computed usage.

42. The electrical power management architecture of claim 1, wherein said power management data comprises power consumption data.

43. The electrical power management architecture of claim 1, wherein said at least one IED further comprises first computer logic including a protocol stack, said protocol stack comprising at least two layers from the group comprising:

an application layer;

a transport layer;

a routing layer;

a switching layer;

an interface layer.

44. The electrical power management architecture of claim 43, wherein said application layer comprises at least one application, said at least one application being operative to punch through a firewall.

45. The electrical power management architecture of claim 43, wherein said application layer comprises an electronic mail application and wherein said power management data is transmitted and said at least one power management command are received as at least one electronic mail message.

46. The electrical power management architecture of claim 45, wherein said protocol stack further comprises said security module, said security module comprising an encryption application operative to encrypt said at least one electronic mail message, which comprises power management data, prior to said power management data being transmitted onto said network and said security module further operative to decrypt said at least one electronic mail message, which comprises at least one power management command, upon receipt from said network.

47. The electrical power management architecture of claim 46, wherein said at least one electronic mail message each comprise first and second portions, said first portion associated with a first key and said second portion associated with a second key, and wherein said first key is operative to allow access to said first portion only and said second key is operative to allow access to said second portion only.

48. The electrical power management architecture of claim 47, wherein said first portion includes said second portion.

49. The electrical power management architecture of claim 43, wherein said application layer comprises an extensible markup language ("XML") application and wherein said power management data is transmitted and said at least one power management command is received in XML format.

50. The electrical power management architecture of claim 43, wherein said application layer comprises a hypertext transfer protocol ("HTTP") application and wherein said power management data is transmitted and said at least one power management command is received in HTTP hypertext markup language format.

51. The electrical power management architecture of claim 43, wherein said application layer comprises a file transfer protocol application and wherein said power management data is transmitted and said at least one power management command is received as at least one data file.

52. The electrical power management architecture of claim 43, wherein said application layer comprises an instant messaging protocol application and wherein said power management data is transmitted and said at least one power management command is received as at least one instant message.

53. The electrical power management architecture of claim 43, wherein said application layer supports peer to peer communications with at least one other of said at least one IED over said network.

54. The electrical power management architecture of claim 43, wherein said protocol stack further comprises simple object access protocol ("SOAP").

55. The electrical power management architecture of claim 43, wherein said protocol stack further comprises secure sockets layer ("SSL").

56. The electrical power management architecture of claim 43, wherein said protocol stack further comprises Secure Hyper Text Transport Protocol ("S-HTTP").

57. The electrical power management architecture of claim 43, wherein said interface layer further comprises an Ethernet interface.

58. The electrical power management architecture of claim 43, wherein said interface layer further comprises a dial up modem.

59. The electrical power management architecture of claim 43, wherein said interface layer further comprises a cellular modem.

60. The electrical power management architecture of claim 43, wherein said interface layer further comprises a Bluetooth interface.

61. The electrical power management architecture of claim 43, wherein said interface layer further comprises an AC power line communications interface.

62. The electrical power management architecture of claim 43, wherein said interface layer further comprises an RF interface.

63. The electrical power management architecture of claim 1, wherein said power management application further comprises a centralized power management application.

64. The electrical power management architecture of claim 1, wherein said power management application further comprises a distributed power management application.

65. The electrical power management architecture of claim 1, wherein said power management application further comprises an application program interface to allow at least one power management application to interface with said electrical power management architecture.

66. The electrical power management architecture of claim 1, wherein said power quality monitoring application is operative to monitor for degradation of power quality across said electrical power distribution system.

67. The electrical power management architecture of claim 66, wherein said power quality monitoring application comprises a local power quality monitoring application on a first of said at least one IED and operative to detect said degradation of power quality on said portion of said electrical power distribution system and report said degradation of power quality to a second of said at least one IED.

68. The electrical power management architecture of claim 67, wherein said second of said at least one IED is downstream of said first of said at least one IED on said electrical power distribution system and further wherein said degradation of power quality comprises a catastrophic power quality event, said first of said at least one IED operative to warn said second of said at least one IED of said catastrophic power quality event.

69. The electrical power management architecture of claim 1, wherein said power quality monitoring application is operative to detect a fault in said electrical power distribution system.

70. The electrical power management architecture of claim 1, wherein said power quality monitoring application is operative to correct a fault in said electrical power distribution system.

71. The electrical power management architecture of claim 1, wherein said power quality monitoring application is operative to locate a fault in said electrical power distribution system.

72. The electrical power management architecture of claim 1, wherein said power quality monitoring application is operative to isolate a fault in said electrical power distribution system.

73. The electrical power management architecture of claim 72, wherein said power quality monitoring application is further operative to control at least one protection relay coupled with said electrical power distribution system.

74. The electrical power management architecture of claim 1, wherein said power management application further comprises a power distribution system reliability monitoring application.

75. The electrical power management architecture of claim 1, wherein said authentication application comprises a cellular modem operative to determine a geographic location of said at least one IED, said authentication data including said geographic location.

76. The electrical power management architecture of claim 1, wherein said authentication data includes a geographic location ID.

77. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

said architecture further comprising:

a power management application coupled with said network and operative to receive and process said power management data from said at least one IED and generate said at least one power management command to said at least one IED to implement said power management function, said power management application further comprising a power quality monitoring application;

said power management data further comprising status data representative of a status of said at least one IED;

wherein said at least one IED further comprises a security module coupled with said first network interface and operative to prevent unauthorized access to said power management data;

wherein said security module is further operative to augment said power management data transmitted onto said network with authentication data and authenticate said at least one power management command received from said network and said power management application comprises an authentication application operative to augment said at least one power management command transmitted onto said network with authentication data and authenticate said power management data received from said network.

78. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

said architecture further comprising:

a power management application coupled with said network and operative to receive and process said power management data from said at least one IED and generate said at least one power management command to said at least one IED to implement said power management function, said power management application further comprising a power quality monitoring application;

said power management data further comprising status data representative of a status of said at least one IED;

wherein said power management application further comprises an IED inventory application.

79. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

said architecture further comprising:

a power management application coupled with said network and operative to receive and process said power management data from said at least one IED and generate said at least one power management command to said at least one IED to implement said power management function, said power management application further comprising a power quality monitoring application;

said power management data further comprising status data representative of a status of said at least one IED;

wherein said power management application further comprises an IED maintenance application.

80. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

said architecture further comprising:

a power management application coupled with said network and operative to receive and process said power management data from said at least one IED and generate said at least one power management command to said at least one IED to implement said power management function, said power management application further comprising a power quality monitoring application;

said power management data further comprising status data representative of a status of said at least one IED;

wherein said at least one IED further comprises first computer logic including a protocol stack, said protocol stack comprising at least two layers from the group comprising:

an application layer;

a transport layer;

a routing layer;

a switching layer;

an interface layer;

wherein said application layer comprises an electronic mail application and wherein said power management data is transmitted and said at least one power management command are received as at least one electronic mail message; wherein said protocol stack further comprises a security module, said security module comprising an authentication application operative to augment said power management data electronic mail messages with authentication data prior to said power management data being transmitted onto said network and said authentication application being further operative to authenticate said at least one power management command upon receipt from said network; wherein said authentication application comprises a cellular modem operative to determine a geographic location of said at least one IED, said authentication data including said geographic location.

81. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

said architecture further comprising:

a power management application coupled with said network and operative to receive and process said power management data from said at least one IED and generate said at least one power management command to said at least one IED to implement said power management function, said power management application further comprising a power quality monitoring application;

said power management data further comprising status data representative of a status of said at least one IED;

wherein said at least one IED further comprises first computer logic including a protocol stack, said protocol stack comprising at least two layers from the group comprising:

an application layer;

a transport layer;

a routing layer;

a switching layer;

an interface layer;

wherein said application layer comprises an electronic mail application and wherein said power management data is transmitted and said at least one power management command are received as at least one electronic mail message; wherein said protocol stack further comprises a security module, said security module comprising an authentication application operative to augment said power management data electronic mail messages with authentication data prior to said power management data being transmitted onto said network and said authentication application being further operative to authenticate said at least one power management command upon receipt from said network;

wherein said authentication data includes a geographic location ID.

82. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

said architecture further comprising:

a power management application coupled with said network and operative to receive and process said power management data from said at least one IED and generate said at least one power management command to said at least one IED to implement said power management function, said power management application further comprising a power quality monitoring application;

said power management data further comprising status data representative of a status of said at least one IED;

wherein said at least one IED further comprises first computer logic including a protocol stack, said protocol stack comprising at least two layers from the group comprising:

an application layer;

a transport layer;

a routing layer;

a switching layer;

an interface layer;

wherein said interface layer further comprises a cellular modem; wherein said cellular modem is further operative to provide geographic location information of said at least one IED to said application layer.

83. A method of managing an electrical power distribution system, said electrical power distribution system comprising an electrical power management architecture, said architecture comprising a network, at least one intelligent electronic device ("IED") coupled with a portion of said electrical power distribution system, and further coupled with said network, and a power management application coupled with said network, said method comprising:

(a) implementing a power management function with each of said at least one IED in conjunction with said portion of said electrical power distribution system;

(b) generating power management data from said power management function; said power management data further comprising status data of said at least one IED;

(c) securing said power management data from unauthorized access;

(d) transmitting said secured power management data over said network;

(e) receiving said secured power management data by said power management application;

(f) authenticating said secured power management data;

(g) processing said authenticated power management data;

(h) generating at least one power management command by said power management application;

(i) securing said at least one power management command from unauthorized access;

(i) transmitting said secured at least one power management command over said network;

(j) receiving said secured at least one power management command by at least one of said at least one IED;

(k) authenticating said secured at least one power management command;

(l) responding to said authenticated at least one power management command to implement said power management function;

wherein said power management application further comprises an IED fraud detection application.

84. The method of managing an electrical power distribution system of claim 83, wherein said method further comprises:

(m) controlling electrical power flow on said portion of said electrical power distribution system.

85. The method of managing an electrical power distribution system of claim 84, wherein said method further comprises:

(n) controlling electrical generation systems coupled with said portion of said electrical power distribution system.

86. The method of managing an electrical power distribution system of claim 84, wherein said method further comprises:

(n) controlling loading on said portion of said electrical power distribution system.

87. The method of managing an electrical power distribution system of claim 83, wherein said power management application comprises an automated meter reading application.

88. The electrical power management architecture of claim 87, wherein said automated meter reading application further comprises a consumption management application.

89. The electrical power management architecture of claim 88, wherein said method further comprises:

(m) reducing consumption on said portion of said electrical power distribution system in response to rate changes by said consumption management application.

90. The electrical power management architecture of claim 88, wherein said method further comprises:

(m) monitoring and tracking costs associated with consumption on said electrical power distribution system by said consumption management application.

91. The electrical power management architecture of claim 90, wherein said method further comprises:

(n) monitoring and tracking costs in substantially real time by said consumption management application.

92. The method of managing an electrical power distribution system of claim 83, wherein said at least one IED comprises an electric meter.

93. The method of managing an electrical power distribution system of claim 83, wherein said at least one IED comprises a revenue meter.

94. The method of managing an electrical power distribution system of claim 83, wherein said at least one IED comprises a protection relay.

95. The method of managing an electrical power distribution system of claim 83, wherein said at least one IED comprises:

a legacy electric meter; and a monitoring and control device coupled with said legacy electric meter, said monitoring and control device further comprising a network interface coupled with said network.

96. The method of managing an electrical power distribution system of claim 83, wherein said method further comprises:

(m) monitoring electrical power quality on said portion of said electrical power distribution system and generating at least one power quality event.

97. A method of managing an electrical power distribution system, said electrical power distribution system comprising an electrical power management architecture, said architecture comprising a network, at least one intelligent electronic device ("IED") coupled with a portion of said electrical power distribution system, and further coupled with said network, and a power management application coupled with said network, said method comprising:

(a) implementing a power management function with each of said at least one IED in conjunction with said portion of said electrical power distribution system;

(b) generating power management data from said power management function; said power management data further comprising status data of said at least one IED;

(c) securing said power management data from unauthorized access;

(d) transmitting said secured power management data over said network;

(e) receiving said secured power management data by said power management application;

(f) authenticating said secured power management data;

(g) processing said authenticated power management data;

(h) generating at least one power management command by said power management application;

(i) securing said at least one power management command from unauthorized access;

(i) transmitting said secured at least one power management command over said network;

(j) receiving said secured at least one power management command by at least one of said at least one IED;

(k) authenticating said secured at least one power management command;

(l) responding to said authenticated at least one power management command to implement said power management function;

wherein said power management application comprises an automated meter reading application; wherein said automated meter reading application further comprises a consumption management application;

wherein said electrical power distribution system distributes power generated by a first supplier, said method further comprising:

(m) switching said electrical power distribution system to distribute power from a second supplier in response to a cost of said power from said first and second suppliers by said consumption management application.

98. The method of managing an electrical power distribution system of claim 97, wherein said at least one IED comprises an electric meter.

99. The method of managing an electrical power distribution system of claim 97, wherein said at least one IED comprises a revenue meter.

100. The method of managing an electrical power distribution system of claim 97, wherein said at least one IED comprises a protection relay.

101. The method of managing an electrical power distribution system of claim 97, wherein said at least one IED comprises:

a legacy electric meter; and a monitoring and control device coupled with said legacy electric meter, said monitoring and control device further comprising a network interface coupled with said network.

102. The method of managing an electrical power distribution system of claim 97, wherein said at least one IED comprises a phasor transducer.

103. The method of managing an electrical power distribution system of claim 97, wherein said method further comprises:

(n) monitoring electrical power quality on said portion of said electrical power distribution system and generating at least one power quality event.

104. The method of managing an electrical power distribution system of claim 103, wherein said method further comprises:

(o) reporting said at least one power quality event monitored on said portion of said electrical power distribution system.

105. The method of managing an electrical power distribution system of claim 97, wherein said method further comprises:

(n) measuring by said at least one IED at least one phasor parameter of said portion of said electrical power distribution system.

106. The method of managing an electrical power distribution system of claim 97, wherein said power management data comprises power consumption data.

107. The method of managing an electrical power distribution system of claim 97, wherein said power management data comprises power quality data.

108. The method of managing an electrical power distribution system of claim 97, wherein said method further comprises:

(n) computing at least one of revenue or cost using tariff/billing data contained within said at least one power management command.

109. The method of managing an electrical power distribution system of claim 97, wherein said method further comprises:

(n) controlling a portion of said electrical power distribution system in response to said at least one power management command.

110. The method of managing an electrical power distribution system of claim 109, wherein said method further comprises:

(o) de-energizing said portion of said electrical power distribution system in response to said at least one power management command.

111. The method of managing an electrical power distribution system of claim 109, wherein a first of said at least one IED is further coupled with a load, said load being further coupled with said portion of said electrical power distribution system, said method further comprises:

(o) at least one of connecting and disconnecting said load from said portion of said electrical power distribution system in response to said at least one power management command.

112. The method of managing an electrical power distribution system of claim 97, wherein said power management application further comprises a centralized power management application.

113. The method of managing an electrical power distribution system of claim 97, wherein said power management application further comprises a distributed power management application.

114. The method of managing an electrical power distribution system of claim 97, wherein said power management application comprises an application program interface to allow at least one power management application to interface with said electrical power management architecture.

115. The method of managing an electrical power distribution system of claim 97, wherein said method further comprises:

(n) receiving said power management data by said power management application, said power management application further comprising a data collection server;

(o) transmitting said power management data as electronic mail messages, said data collection server further comprising an electronic mail server.

116. The method of managing an electrical power distribution system of claim 97, wherein said method further comprises:

(n) receiving said power management data by said power management application, said power management application further comprising a data collection server coupled with said network;

(o) transmitting said power management data in extensible markup language format, said data collection server further comprising an extensible markup language server.

117. The method of managing an electrical power distribution system of claim 97, wherein said automated meter reading application further comprises a billing management application.

118. The method of managing an electrical power distribution system of claim 117, wherein said method further comprises:

(n) transmitting a command from said billing management application to each of said at least one IED over said network to cause said at least one IED to transmit billing data to said billing management application over said network.

119. The method of managing an electrical power distribution system of claim 117, wherein said method further comprises:

(n) transmitting billing data by each of said at least one IED to said billing management application.

120. The method of managing an electrical power distribution system of claim 119, wherein said transmitting further comprises:

(o) transmitting billing data by said at least one IED according to a pre-defined schedule.

121. The method of managing an electrical power distribution system of claim 119, wherein said transmitting further comprises:

(o) transmitting billing data by said at least one IED in response to a pre-defined event.

122. The method of managing an electrical power distribution system of claim 97, wherein said power management data comprises at least one power management command to at least one other of said at least one IED.

123. The method of managing an electrical power distribution system of claim 97, wherein said automated meter reading application further comprises a billing management application.

124. The method of managing an electrical power distribution system of claim 123, wherein said method further comprises:

(n) transmitting a command from said billing management application to each of said at least one IED over said network to cause said at least one IED to transmit billing data to said billing management application over said network.

125. The method of managing an electrical power distribution system of claim 83, wherein said method further comprises:

(n) receiving said power management data by said power management application, said power management application further comprising a data collection server coupled with said network;

(o) transmitting said power management data in extensible markup language format, said data collection server further comprising an extensible markup language server.

126. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network;

a security module coupled with said first network interface and operative to prevent unauthorized access to said power management data;

said architecture further comprising:

a power management application coupled with said network and operative to receive and process said power management data from said at least one IED and generate said at least one power management command to said at least one IED to implement said power management function, said power management application further comprising a power reliability monitoring application;

wherein said security module is further operative to augment said power management data transmitted onto said network with authentication data and authenticate said at least one power management command received from said network and said power management application comprises an authentication application operative to augment said at least one power management command transmitted onto said network with authentication data and authenticate said power management data received from said network.

127. An electrical power management architecture for managing an electrical power distribution system comprising:

a network;

at least one intelligent electronic device ("IED") coupled with said electrical power distribution system and further coupled with said network, each of said at least one IED operative to implement a power management function in conjunction with a portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network; and a security module coupled with said first network interface and operative to prevent unauthorized access to said power management data;

said architecture further comprising:

a power management application coupled with said network and operative to receive and process said power management data from said at least one IED and generate said at least one power management command to said at least one IED to implement said power management function, said power management application further comprising a power outage application;

wherein said security module is further operative to augment said power management data transmitted onto said network with authentication data and authenticate said at least one power management command received from said network and said power management application comprises an authentication application operative to augment said at least one power management command transmitted onto said network with authentication data and authenticate said power management data received from said network.

128. The electrical power management architecture of claim 126, wherein said at least one IED comprises an electric meter.

129. The electrical power management architecture of claim 127, wherein said at least one IED comprises an electric meter.

* * * * *